(12) United States Patent
Komocki et al.

(10) Patent No.: US 11,945,740 B2
(45) Date of Patent: *Apr. 2, 2024

(54) SURFACE WATER MITIGATION STRUCTURE

(71) Applicant: Sports Care products, Inc., Cleveland, OH (US)

(72) Inventors: David Komocki, Novelty, OH (US); Peter C. Beeson, Jamestown, NY (US); Craig Roeper, Cleveland, OH (US)

(73) Assignee: SPORTS CARE PRODUCTS, INC, Cleveland, OH (US)

( * ) Notice: Subject to any disclaimer, the term of this patent is extended or adjusted under 35 U.S.C. 154(b) by 212 days.

This patent is subject to a terminal disclaimer.

(21) Appl. No.: 17/188,521

(22) Filed: Mar. 1, 2021

(65) Prior Publication Data

US 2021/0206675 A1  Jul. 8, 2021

Related U.S. Application Data

(63) Continuation of application No. 16/293,145, filed on Mar. 5, 2019, now Pat. No. 11,021,379, which is a (Continued)

(51) Int. Cl.
*C02F 3/04* (2023.01)
*C02F 3/10* (2023.01)
(Continued)

(52) U.S. Cl.
CPC .............. *C02F 3/046* (2013.01); *C02F 3/106* (2013.01); *C02F 3/107* (2013.01); *C02F 3/108* (2013.01);
(Continued)

(58) Field of Classification Search
CPC ..... E01C 11/225; E01C 11/224; A01K 1/015; A01K 1/0151; A01K 1/0157; A01K 31/007; C02F 3/046; C02F 3/107; C02F 3/108
(Continued)

(56) References Cited

U.S. PATENT DOCUMENTS 5,230,586 A * 7/1993 Bachhausen .............. B09C 1/10
405/36
6,206,607 B1   3/2001 Medico, Jr. et al.
(Continued)

FOREIGN PATENT DOCUMENTS

WO   2011065835   3/2011

OTHER PUBLICATIONS

U.S. Search Authority, International Search Report and Written Opinion for related application No. PCT/US2019/021302 (dated May 14, 2019).
(Continued)

*Primary Examiner* — Claire A Norris
(74) *Attorney, Agent, or Firm* — UB Greensfelder LLP; Brian E Turung

(57) ABSTRACT

A surface water mitigation structure suitable for use in the storage and treatment of contaminated surface water runoff. The runoff is processed through a multi-layered filtration and treatment system wherein the first layer is one or more permeable layers that is pervious enough to allow liquid runoff to pass through it and into a porous storage medium second layer that includes one or more remediating agents, and wherein the effluent from the surface water mitigation structure can be discharged to the ground, the surface, and/or a drainage system reduced or free of contaminants.

10 Claims, 9 Drawing Sheets

Related U.S. Application Data continuation-in-part of application No. 15/468,399, filed on Mar. 24, 2017, now abandoned.

(60) Provisional application No. 62/321,779, filed on Apr. 13, 2016.

(51) Int. Cl.
| | |
|---|---|
| *C02F 3/34* | (2023.01) |
| *E03F 1/00* | (2006.01) |
| *C02F 1/00* | (2023.01) |
| *C02F 101/10* | (2006.01) |
| *C02F 101/30* | (2006.01) |
| *C02F 101/32* | (2006.01) |
| *C02F 103/00* | (2006.01) |
| *C02F 103/20* | (2006.01) |

(52) U.S. Cl.
CPC .............. *C02F 3/341* (2013.01); *C02F 3/348* (2013.01); *E03F 1/00* (2013.01); *C02F 1/001* (2013.01); *C02F 2101/103* (2013.01); *C02F 2101/105* (2013.01); *C02F 2101/306* (2013.01); *C02F 2101/32* (2013.01); *C02F 2103/001* (2013.01); *C02F 2103/20* (2013.01); *C02F 2209/40* (2013.01); *C02F 2303/10* (2013.01); *C02F 2305/06* (2013.01)

(58) Field of Classification Search
USPC .............. 404/31; 119/447, 526, 527; 405/50; 210/617
See application file for complete search history.

(56) References Cited

U.S. PATENT DOCUMENTS

| | | | |
|---|---|---|---|
| 9,551,113 B1 | 1/2017 | Polivka | |
| 11,021,379 B2* | 6/2021 | Komocki | ................ C02F 3/046 |
| 2004/0067103 A1 | 4/2004 | Hart | |
| 2008/0267701 A1* | 10/2008 | Lowe | ..................... E01C 3/003 |
| | | | 404/72 |
| 2010/0272514 A1 | 10/2010 | Hart et al. | |
| 2011/0211908 A1* | 9/2011 | Krzyzak | ............... E01C 11/224 |
| | | | 404/70 |
| 2012/0045279 A1 | 2/2012 | Chen et al. | |
| 2017/0297936 A1 | 10/2017 | Komocki et al. | |

OTHER PUBLICATIONS

European Patent Office, Extended Search Report for corresponding AP application No. 19919437,7 (dated Mar. 13, 2023).

* cited by examiner

SURFACE WATER MITIGATION STRUCTURE

The present invention is a continuation of U.S. patent application Ser. No. 16/293,145 filed Mar. 5, 2019 know U.S. Pat. No. 11,021,379), which in turn is a continuation-in-part of U.S. patent application Ser. No. 15/468,399 filed Mar. 24, 2017, which in turn claims priority on U.S. Provisional Patent Application Ser. No. 62/321,779 filed Apr. 13, 2016, which are all incorporated herein by reference.

The present invention is directed to a multi-layered surface/subsurface structure suitable for use as a water treatment and/or filtration system. The invention finds particular application in conjunction with storage and treatment of contaminated surface water and will be described with particular reference thereto. However, it is to be appreciated that the present invention is also amenable to other applications.

BACKGROUND OF THE INVENTION

Contaminated water is a worldwide problem. Surface water runoff (hereafter referred as "runoff") from roadways, parking lots, factories, and fertilized fields are often contaminated with undesirable compounds that are hazardous to both the environment and to human health. For example, runoff containing hydrocarbons can adversely affect the central nervous system or affect the blood, immune system, lungs, skin, and eyes. Also, water containing high nutrient load can contribute to the contamination and production of harmful algae blooms that affect lake water, river water, sewer water, reservoir facilities, etc.

Generally, such contaminants (e.g., hydrocarbons, etc.) are attributed to the use of cars, trucks, trains, etc. on the surface of roadways, parking lots, etc. and can infiltrate into the ground, thereby contaminating reservoirs and the underlying groundwater. The contamination is typically the result of waste leaking or leaching onto roadways, sidewalks, the ground, etc. that is then flushed off the impermeable roadways and into the ground after a period of precipitation.

Other sources of contaminated water are animal houses, animal shelters, stables and the like wherein large amounts of waste are generated by the housed animals. Typically, the animal waste is partially picked up and the remainder is washed away into the environment. For environments that include dirt floors, hay, sand and the like, the washing away of the waste can be difficult and unsanitary.

It would be desirable to provide a surface water mitigation structure and/or topping that can be used to treat such contaminated surface water runoff prior to it entering aquifers and reservoirs.

SUMMARY OF THE INVENTION

The present invention is directed to a surface water mitigation structure that can be used as a water treatment and/or filtration system which is durable enough to be used in outdoor applications (e.g., roadways, parking lots, sidewalks, cart paths, bicycle paths, urban tree surrounds, horse stalls, drainage basins, animal shelter floors, stable floors, etc.), and which surface water mitigation structure and/or topping has a multi-layered structure that includes remediating agents used to at least partially treat contaminants, and which can be used to treat contaminated water effectively.

According to one non-limiting aspect of the present invention, the surface water mitigation structure can comprise at least two layers: 1) a permeable composite capstone layer that can support substantial loads yet can be pervious enough to allow top water runoff to pass through the layer; and 2) a porous storage medium layer that can absorb and/or hold water that has passed through the permeable composite capstone layer.

According to another non-limiting aspect of the present invention, the surface water mitigation structure can comprise at least three layers: 1) a flexible permeable layer, 2) a permeable support layer, and 3) a porous storage medium layer that can absorb and/or hold water that has passed through the permeable layer and permeable support layer. As can be appreciated, the flexible permeable layer can optionally be bonded to the permeable support layer so as to eliminate one independent layer in the system; however, this is not required.

The porous storage medium layer is optionally designed to at least contain and/or be inoculated with remediating agents (e.g., chemical, physical, and/or biological remediating agents) that are designed to break down contaminants in the runoff that has passed through the permeable composite capstone layer. The addition of the remediating agents to the porous storage medium can be done at the time of installation and/or post-added after the one or more permeable layers are positioned atop the porous storage medium layer. The porous storage medium layer is also optionally designed to retain and/or absorb the runoff for a period of time to allow the remediating agents to break down the contaminants before the runoff enters the surrounding environment.

The surface water mitigation structure of the present invention is capable of removing contaminants and/or pollutants (e.g., water that includes human and/or animal waste, pesticides, hydrocarbons [e.g., gasoline, oil, solvents, wax, lubricants, etc.], organic waste, inorganic waste, metals, etc.) from runoff (e.g., storm water runoff, waste water runoff, water runoff from irrigation, precipitation, broken water lines, natural disasters, etc.) by subjecting the water through a multi-layered filtration and treatment system.

In one non-limiting aspect of the present invention, the first layer of the system is a permeable composite capstone layer that can support substantial loads yet be pervious enough to allow surface water and other liquid runoff to pass through it. The flow path of the water and other liquids through the permeable composite capstone layer can be effected by its structure. The water and other liquid from the permeable composite capstone layer then flows into the porous storage medium layer where it is treated under aerobic conditions. The treated water and other liquid from the surface water mitigation structure can be discharged to the ground, the surface, and/or a drainage system.

According to one non-limiting aspect of the invention, the permeable composite capstone layer can be a composite; however, this is not required. The permeable composite capstone layer is designed to support substantial loads while remaining permeable enough to allow top runoff to pass through the permeable composite capstone layer. The permeable composite capstone layer can be formed of a base material that is dispersed in a binder to form the permeable composite capstone layer. The based material can be formed of one or more natural materials and/or man-made materials. Non-limiting natural materials include limestone, shale, slate, sandstone, quartz, feldspar, dolomite, obsidian, mica, diorite, flint, granite, stone, metal, etc. Non-limiting man-made materials include glass, rubber, ceramic, plastic, recycled concrete, recycled asphalt, expanded shale, expanded slate, recycled plastic, recycled metal, recycled rubber, recycled glass, etc. The average particle size of the base material is 0.5-100 mm (and all values and ranges therebetween) based on ISO 14688-1:2002, and typically about 1-60 mm based on ISO 14688-1:2002, and more typically 2-30 mm based on ISO 14688-1:2002 based on ISO 14688-1:2002. The binder can be formed of or include one or more resins. Non-limiting examples of resins include epoxy, urethane, polyurethane, acrylic, styrene butadiene, silicone, vinylester, phenolic, polyester or fiberglass resin, etc. In one specific, non-limiting example, the permeable composite capstone layer includes a base material having an average particle size of 2-30 mm that is formed of 60-100% of one or more of limestone, shale, slate, sandstone, quartz, feldspar, dolomite, obsidian, mica, diorite, flint, granite, stone, metal, glass, rubber, ceramic, plastic, recycled concrete, recycled asphalt, expanded shale, expanded slate, recycled plastic, recycled metal, recycled rubber, and/or recycled glass, and wherein the base material is bonded together with a binder that is formed of 60-100% of a binder that is formed of or includes a resin that is at least partially formed of epoxy resin, urethane and/or polyurethane resin, acrylic resin, styrene butadiene resin, silicone resin, vinylester resin, phenolic resin, polyester resin and/or fiberglass resin, and wherein the total weight of base material and the binder constitutes about 85-100 wt. % of the permeable composite capstone layer. In another specific, non-limiting example, the permeable composite capstone layer includes a base material having an average particle size of 3-25 mm that is formed of 60-100% two or more of limestone, shale, slate, sandstone, quartz, feldspar, dolomite, obsidian, mica, diorite, flint, granite, stone, metal, glass, rubber, ceramic, plastic, recycled concrete, recycled asphalt, expanded shale, expanded slate, recycled plastic, recycled metal, recycled rubber, and/or recycled glass, and wherein the base material is bonded together with a binder that is formed of 60-100% of a binder that is formed of or includes a resin that is at least partially formed of epoxy resin, urethane and/or polyurethane resin, acrylic resin, styrene butadiene resin, silicone resin, vinylester resin, phenolic resin, polyester resin and/or fiberglass resin, and wherein the total weight of base material and the binder constitutes about 85-100 wt. % of the permeable composite capstone layer. In another specific, non-limiting example, the permeable composite capstone layer includes a base material having an average particle size of 3-25 mm that is formed of 60-100% two or more of shale, slate, quartz, granite, stone, rubber, ceramic, plastic, recycled concrete, recycled asphalt, expanded shale, expanded slate, recycled plastic, recycled metal, recycled rubber, and/or recycled glass, and wherein the base material is bonded together with a binder that is formed of 60-100% of a binder that is formed of or includes a resin that is at least partially formed of epoxy resin, urethane and/or polyurethane resin, acrylic resin, styrene butadiene resin, silicone resin, vinylester resin, phenolic resin, polyester resin and/or fiberglass resin, and wherein the total weight of base material and the binder constitutes about 85-100 wt. % of the permeable composite capstone layer. In another specific, non-limiting example, the permeable composite capstone layer includes a base material having an average particle size of 3-20 mm that is formed of 80-100% recycled concrete and recycled rubber, and wherein the base material is bonded together with a binder that is formed of 80-100% urethane or polyurethane resin, and wherein the total weight of base material and the binder constitutes about 90-100 wt. % of the permeable composite capstone layer.

The permeable composite capstone layer can be formed from one or more materials which permit easy mixing, can be applied with standard troweling and/or paving techniques, and/or can be set and/or cured in place; however, this is not required. In one specific non-limiting example, the permeable composite capstone layer is formed by mixing one or more binders [prior to the substantial setting or curing (e.g., prior to 60-100% full setting or full curing) of the one or more binders] with one or more base materials, and then pouring and spreading said mixture of base material and binder on the top surface of or above the porous storage medium layer, and then allowing the one or more binders to set and/or cure to form a permeable composite cap stone layer.

In other and/or alternative non-limiting embodiments, the permeable composite capstone layer is at least abrasion resistant, freeze/thaw resistant, and/or durable enough to support major loads (e.g., the weight of a person, car, truck, train, bus, etc.). In another non-limiting embodiment, the permeable composite capstone layer is formulated to form a rigid structure. In one non-limiting embodiment, the rigid structure is designed such that a slab of permeable rigid composite capstone layer having a thickness of 1 inch, a width of 6 inches and a length of 2 ft. can be subjected to a force on a top surface of the slab of at least 25 lbs./ft.$^2$ without breaking under such load or deflecting more than 10% under such load (ASTM F1304 or ASTM F3248 or ASTM E2322). In another non-limiting embodiment, the rigid structure is designed such that a slab of permeable rigid composite capstone layer having a thickness of 1 inch, a width of 6 inches and a length of 2 ft. can be subjected to a force on a top surface of the slab of at least 50 lbs./ft.$^2$ without breaking under such load or deflecting more than 10% under such load (ASTM F1304 or ASTM F3248 or ASTM E2322). In another non-limiting embodiment, the rigid structure is designed such that a slab of permeable rigid composite capstone layer having a thickness of 1 inch, a width of 6 inches and a length of 2 ft. can be subjected to a force on a top surface of the slab of at least 100 lbs./ft.$^2$ without breaking under such load or deflecting more than 10% under such load (ASTM F1304 or ASTM F3248 or ASTM E2322). In another non-limiting embodiment, the rigid structure is designed such that a slab of permeable rigid composite capstone layer having a thickness of 1 inch, a width of 6 inches and a length of 2 ft. can be subjected to a force on a top surface of the slab of at least 150 lbs./ft.$^2$ without breaking under such load or deflecting more than 10% under such load (ASTM F1304 or ASTM F3248 or ASTM E2322).

The weight ratio of binder to base material in the permeable composite capstone layer can be from about 1:0.5 to about 1:50 (and all values and ranges therebetween), more typically about 1:1.001 to about 1:20, yet more typically from about 1:2 to about 1:16, and still more typically from about 1:5 to about 1:10; however, other ratios can be used. In one specific embodiment, the weight ratio of binder to base material is 1:8; however, this is not required. Generally, the weight ratio of binder to base material can be selected based on the size of the one or more base materials used; however, this is not required. In one non-limiting embodiment, the weight ratio of binder to base material can be selected such that the surface water runoff is allowed to pass through the permeable composite capstone layer at a rate of at least 0.25 inch of water per square foot per hour (e.g., 0.25-5000 inches of water per square per hour or 0.156-3116.7 gallons per hour (gph)/ft$^2$ and all values and ranges therebetween. In another non-limiting embodiment, the weight ratio of binder to base material can be selected such that the surface water runoff is allowed to pass through the permeable composite capstone layer at a rate of 0.5-800 inches of water per square foot per hour. In another non-limiting embodiment, the weight ratio of binder to base material can be selected such that the surface water runoff is allowed to pass through the permeable composite capstone layer at a rate of 1-600 inches of water per square foot per hour, etc.). The weight ratio of binder to base material can be selected to control the volume of water that can flow through the permeable composite capstone layer over a period of time. Generally, the more binder that is used, the smaller the volume of water that can flow through the permeable composite capstone layer over a period of time. The amount of base material in the permeable composite capstone layer can be used to control the wear rate of the permeable composite capstone layer over time. When the permeable composite capstone layer has larger amounts of binder, the wear resistance of the permeable composite capstone layer generally increases; however, this is not required. As such, the weight ratio of binder to base material can be selected to control the permeability, porosity, density and/or wear resistance of the permeable composite capstone layer; however, this is not required. The average size of the passageways through the permeable composite capstone layer is generally less than the average particle size of the materials forming the porous storage medium layer so that the materials forming the porous storage medium layer do not and cannot pass through the permeable composite capstone layer.

According to one non-limiting embodiment of the present invention, the permeable composite capstone layer can include about 10 wt. % to about 80 wt. % of a first base material (and all values and ranges therebetween), about 10 wt. % to about 80 wt. % of a second base material (and all values and ranges therebetween), about 5 wt. % to about 60 wt. % of a binder (and all values and ranges therebetween), and less than about 5 wt. % of an additive (and all values and ranges therebetween); however, this is not required. In another non-limiting embodiment, the permeable composite capstone layer can include about 20 wt. % to about 80 wt. % of a first base material, about 20 wt. % to about 80 wt. % of a second base material, about 10 wt. % to about 20 wt. % of a binder, and less than about 2 wt. % of an additive; however, this is not required. According to one specific non-limiting example of the present invention, the permeable composite capstone layer can be a 50/50 wt. % mixture of recycled concrete and recycled rubber, blended together with 16 wt. % of a moisture-curable urethane or polyurethane such that the moisture-curable urethane or polyurethane constitutes about 14-18 wt. % of the permeable composite capstone layer and the recycled concrete and recycled rubber constitute about 80-86 wt. % of the permeable composite capstone layer. Additive can be optionally added to the permeable composite capstone layer in an amount of up to about 4.5 wt. % (e.g., binder catalyst, pigment, silane, microbes, etc.). One non-limiting advantage of using a rubber-based material in the permeable composite capstone layer is that the rubber exhibits rebound and flexibility; however, other or additional materials can be used in the permeable composite capstone layer to obtain such a feature of the permeable composite capstone layer. One non-limiting additive that can be used are silanes. Silanes can be used in the capstone layer to promote adhesion between the different solid components. Another non-limiting additive that can be used in the capstone layer are pigments. A variety of pigments and pigment dispersions can optionally be used in the capstone layer to provide coloring.

The fully set or cured permeable composite capstone layer is formed of materials that do not significantly change in size, volume and shape when exposed to water. In one non-limiting embodiment, the fully set or cured permeable composite capstone layer changes less than 10% in size, volume and shape when saturated with water, and typically changes less than 5% in size, volume and shape when saturated with water, and more typically changes less than 2% in size, volume and shape when saturated with water, even more typically changes less than 1% in size, volume and shape when saturated with water, and yet even more typically changes less than 0.1% in size, volume and shape when saturated with water.

In another non-limiting aspect of the present invention, is not in the form of a permeable composite capstone layer, but instead the first layer of the system is a top flexible porous layer that is positioned on top of a support layer, which support layer is positioned between the top flexible porous layer and the porous storage medium layer. In one non-limiting embodiment, the top flexible porous layer is a preformed layer. The preformed layer can be available in pre-cut sheets of material, or be available in rolls of material that can be cut to length and width. The flexible porous layer is designed to 1) allow liquids to flow through the flexible porous layer, 2) provide a softer surface when walked upon by humans and/or animals, and/or 3) prevent or inhibit any the materials forming the porous storage medium layer that have passed through the support layer from passing through the flexible porous layer.

In one non-limiting embodiment, the top flexible layer is partially or fully formed of a fiber mesh that can a woven or non-woven mesh. The fiber can be a natural or man-made fiber. The thickness of the fiber mesh is generally at least 0.1 inches and is typically 0.1-5 inches (and all values and ranges therebetween). The fibers in the top portion of the fiber mesh or all of the fibers of the fiber mesh can optionally include a polymer coating. The thickness of the coating is non-limiting. Generally, the thickness of the porous polymer coating (when used) is at least 0.01 micron. The top flexible layer generally has a liquid permeability of at least 0.25 inch of water per square foot per hour (e.g., 0.25-16000 inches of water per square per hour or 0.156-9350 $gph/ft^2$ and all values and ranges therebetween, 100-15,000 inches of water per square foot per hour, 500-4,000 inches of water per square foot per hour, etc.); however, this is not required. One non-limiting type of top flexible layer is a non-woven polypropylene fiber sheet such as Geotex® 401 by Popex. Such top flexible layers are generally available in precut sheets or in rolls of 50 ft. or more and a width of 5-15 feet at a thickness of 0.25-2 inches; however, the material can be available in other dimensions.

In another non-limiting embodiment, the top flexible porous layer is a flexible polymer or rubber sheet that may or may not have a reinforcement scrim or mat. One non-limiting type of polymer sheet is a vinyl polymer sheet. One non-limiting type of rubber sheet is a pervious rubber sheet that is formed of particles of rubber that are adhesively connected together (e.g., polyurethane binder, etc.). The thickness of the polymer or rubber sheet is generally at least 1 mm and typically 1 mm to 2 inch (and all values and ranges therebetween). If the polymer or rubber sheet is non-porous or has limited porosity, one or more openings can be formed through the polymer or rubber sheet to obtain the desired about of liquid flow through the sheet. When one or more openings are included in the polymer or rubber sheet, the diameter of the one or more openings is generally less than 5 mm, and typically less than 3 mm. In one non-limiting configuration, the average diameter of the openings is less than the average particle size of the materials forming the porous storage medium layer. In another non-limiting embodiment, the polymer or rubber sheet is a preformed sheet. Such top flexible layers are generally available in precut sheets or in rolls of 50 ft. or more and a width of 5-15 feet at a thickness of 0.1-2 inches; however, the material can be available in other dimensions. The top flexible layer generally has a liquid permeability of at least 0.25 inch of water per square foot per hour (e.g., 0.25-5000 inches of water per square per hour or 0.156-3116.7 gallons per hour (gph)/ft$^2$ and all values and ranges therebetween, 0.5-800 inches of water per square foot per hour, 1-600 inches of water per square foot per hour, etc.); however, this is not required.

In another non-limiting aspect of the present invention, there is provided a support layer that is configured to provide support to the top flexible porous layer. The support layer is generally formed of a different material from the top flexible support layer. The support layer generally is less flexible than the top flexible layer. Generally, the flexibility of the support layer is at least 30% less flexible than the top flexible layer, typically the flexibility of the support layer is at least 50% less flexible than the top flexible layer, more typically the flexibility of the support layer is at least 100% less flexible than the top flexible layer, and even more typically the flexibility of the support layer is at least 150% less flexible than the top flexible layer. The support layer can be formed of a variety of materials (e.g., wood, glass, ceramic, rubber, plastic, metal, composite material, etc.). In one non-limiting embodiment, the support layer is formed of the permeable composite capstone layer as previously discussed above. In another non-limiting embodiment, the support layer is formed of a non-porous material and includes a plurality of openings through the body of the non-porous material to enable liquid to flow through support layer. When one or more openings are included in the support layer, the diameter of the one or more opening is generally about 0.1-20 mm (and all values and ranges therebetween), and typically about 1-10 mm. In one non-limiting configuration, the average diameter of the openings is less than the average particle size of the materials forming the porous storage medium layer. The number and size of the openings in the support layer are selected that the flowrate of water through 1 ft.$^2$ of the support layer is at least 0.1 inch of water per square foot per hour (e.g., 0.1-16000 inches of water per square per hour) and all values and ranges therebetween. In one non-limiting embodiment, the flowrate of water through 1 ft.$^2$ of the support layer is about 1-1000% the flowrate of water through 1 ft.$^2$ of the top flexible layer, and typically the flowrate of water through 1 ft.$^2$ of the support layer is about 10-200% the flowrate of water through 1 ft.$^2$ of the top flexible layer. As such, the flowrate of water through 1 ft.$^2$ of the support layer can be less, the same or greater than the flowrate of water through 1 ft.$^2$ of the top flexible layer. In another non-limiting embodiment, the support layer is a preformed layer. The thickness of the support layer is generally at least 0.2 inches, typically 0.2-5 inches (and all values and ranges therebetween), and more typically 0.25-1 inches. When the support layer is formed of a rubber material, the hardness of the rubber material is generally 40-80 Shore A hardness (and all values and ranges therebetween), and typically 50-70 Shore A hardness.

In another non-limiting embodiment, the pieces of support layer can optionally be configured to be interlocking so that a plurality of pieces of support layer can be connected together. The thickness, hardness and flexibility of the support layer are selected to prevent the support layer from overly flexing or distorting in shape during use so as to prevent the materials forming the porous storage medium layer from moving through the perforations or holes in the support layer during use of the surface water mitigation structure.

The dimensions and shape of the one or more permeable layers can vary according to the size and shape of the site in which the surface water mitigation structure is to be used. Similarly, the dimensions and shape of the one or more permeable layers can be selected based on desired flow rates and quantity of water to be treated and/or filtered. Generally, the one or more permeable layers are relatively thin compared to its surface area. In non-limiting arrangements, the ratio of depth to the top surface area of the one or more permeable layers for a 100 ft.$^2$ surface area is typically at least 1:20, more typically at least 1:100, and still more typically at least 1:1000; however, this is not required. As can be appreciated, other ratios can be used based on the desired application. Generally, the one or more permeable layers have an average thickness of at least 0.1 inches, typically about 0.25-20 inches (and all values and ranges therebetween), and more typically about 0.5-8 inches.

The one or more permeable layers can include a flow gradient wherein the porosity permeability at or near the top surface of the one or more permeable layers is substantially greater than the permeability at or near the bottom surface of the one or more permeable layers; however, this is not required. As such, the flow gradient can allow for a hydraulic gradient or pressure for the purpose of forcing water downward and through the one or more permeable layers. Also, the flow gradient can optionally spread out a recharge area, thus increasing the amount of water into the storage medium layer. Also, the flow gradient can reduce the formation of black ice on the surface during cold conditions. In one non-limiting embodiment, the one or more permeable layers is designed such that multiple channels are formed in the one or more permeable layers such that the permeability of water through the top surface of the one or more permeable layers is the same or within 20% for each square foot of the top surface of the one or more permeable layers; however, this is not required. In another non-limiting embodiment, greater than 50% of the channels through the thickness of the one or more permeable layers are non-linear along the longitudinal length of each of the channels. In another non-limiting embodiment, greater than 50% of the channels through the thickness of the one or more permeable layers has a different longitudinal length and/or a non-uniform cross-sectional shape along the longitudinal length of the channel. In another non-limiting embodiment, the channels formed in the permeable layer wherein permeable layer is or includes a permeable composite capstone layer are formed from the mixture of binder and base material and the amount of such materials, and not from the post drilling of channels in the formed permeable composite capstone. In another non-limiting embodiment, the channels formed in the permeable layer wherein the permeable layer includes a flexible top layer that includes woven or non-woven fabric are at least partially formed by the voids between the fabric fibers.

According to another and/or alternative non-limiting aspect of the invention, the one or more permeable layers can serve the purpose of a support layer and/or a collection drain. As such, the one or more permeable layers can cause the surface water to flow through the one or more permeable layers and into the porous storage medium layer, thereby minimizing and/or reducing runoff from the surface of the one or more permeable layers; however, this is not required.

As can be appreciated, one or more drains can be inserted in the one or more permeable layers to also facilitate in minimizing and/or reducing runoff from the top surface of the one or more permeable layers; however, this is not required. As can be appreciated, curbs and/or raised edges can be used with and/or formed in the one or more permeable layers to facilitate in minimizing and/or reducing runoff from the top surface of the one or more permeable layers; however, this is not required. The top surface of the one or more permeable layers can be sloped to facilitate in minimizing and/or reducing runoff from the top surface of the one or more permeable layers; however, this is not required.

In use, the liquid contacts the top surface of the one or more permeable layers and passes downwardly through the one or more permeable layers and into the porous storage medium layer that is located below the one or more permeable layers. The permeability of the one or more permeable layers can be selected to control the flowrate of the liquid through the one or more permeable layers so as to prevent oversaturation of the porous storage medium layer that is located below the one or more permeable layers; however, this is not required.

Generally, the surface water mitigation structure is constructed such that the force of gravity causes the liquid to pass through the one or more permeable layers and into the porous storage medium layer with remediating agents. As such, the surface water mitigation structure is capable of collecting water, storing water, treating contaminants with chemical, physical and/or biological remediating agents, and then releasing the treated runoff; however, this is not required. As such, contaminated runoff can be treated such that any untreated contaminants flowing into storm sewers or directly into wetlands can be reduced and/or eliminated.

In one non-limiting aspect of the invention, a watertight and/or impermeable material (e.g., raised edge or curb structure, etc.) can be disposed along one or more sides of the one or more permeable layers to allow liquid to flow through the one or more permeable layers by the force of gravity into the porous storage medium layer, but inhibit or prevent the flow of liquid from flowing from the top surface of the one or more permeable layers and into the surrounding ground.

According to another and/or alternative non-limiting aspect of the invention, the porous storage medium layer is a fluid-absorbent layer; however, this is not required. The porous storage medium layer can be a water-absorbing material; however, this is not required. The porous storage medium layer is designed to retain sufficient amounts of fluid to support remediating agent activity, yet durable enough to support loads of the one or more permeable layers without being damaged or substantially crushed by such loads.

The porous storage medium layer can be made from one or more materials and associated void spaces. In non-limiting embodiments, the porous storage medium layer can be formed of one or more storage medium components selected from the group consisting of shale, slate, expanded shale, and/or expanded slate. One non-limiting advantage of using shale, slate, expanded shale and expanded slate is that these materials have the unique ability to retain large amounts of water while still retaining support/compact strength. As defined herein, "expanded shale" is define as a lightweight aggregate formed from shale that has been mined, crushed and fired under high temperatures (e.g., rotary kiln) to form a porous and light material. As defined herein, expanded slate is slate which has expanded to many times its original volume as a result of exfoliation to form a lightweight aggregate. In another non-limiting embodiment, about 80-100% of the material used to form the porous storage medium layer changes less than 10% in the size, volume and shape when saturated with water, typically about 80-100% of the material used to form the porous storage medium layer changes less than 5% in the size, volume and shape when saturated with water, more typically about 80-100% of the material used to form the porous storage medium layer changes less than 2% in the size, volume and shape when saturated with water, and even more typically about 80-100% of the material used to form the porous storage medium layer changes less than 1% in the size, volume and shape when saturated with water. In another non-limiting embodiment, at least 25 wt. % of the porous storage medium layer is formed of shale, slate, expanded shale, and/or expanded slate, typically at least 40 wt. % of the porous storage medium layer is formed of shale, slate, expanded shale, and/or expanded slate, more typically greater than 50 wt. % of the porous storage medium layer is formed of shale, slate, expanded shale, and/or expanded slate, still more typically at least 60 wt. % of the porous storage medium layer is formed of shale, slate, expanded shale, and/or expanded slate, even more typically at least 75 wt. % of the porous storage medium layer is formed of shale, slate, expanded shale, and/or expanded slate, and yet more typically 80-100 wt. % of the porous storage medium layer is formed of shale, slate, expanded shale, and/or expanded slate.

In non-limiting embodiments, the material of the porous storage medium layer includes a lightweight material (e.g., expanded shale, expanded slate, etc.); however, this is not required. In other and/or alternative non-limiting embodiments, the material of the porous storage medium layer includes a storage medium component that is lightweight (e.g., expanded shale, expanded slate, etc.); however, this is not required. One non-limiting advantage of using a storage medium component having lightweight components (LWAs) is that unstable soil can be converted into usable land. As such, the LWA can be used over compressible soils and still have the ability to support extreme loads (e.g., roadways, sidewalks, train tracks, runways, etc.). The unique structure of the storage medium components provides benefits of hydraulic conductivity, such that the storage medium components allows for fast free drainage, and a high angle of internal friction, which provides increased strength and stability. Further, the use of storage medium components can reduce and/or remove various amounts of hazardous chemicals (e.g., phosphorous, arsenic, hydrocarbons, etc.) due to its outer layer molecular charge. In non-limiting embodiments, one cubic yard of storage medium components can retain more than 10 gallons of water, typically more than 25 gallons of water, and more typically more than 50 gallons of water; however, this is not required. The one or more storage medium components can vary in size and is in the range from about 0.01 mm to about 2 cm (and all values and ranges therebetween), more typically from about 0.10 mm to about 1 cm, and still more typically from about 0.2 mm to about 500 mm; however, other sizes may be used. In one specific embodiment, the average diameter of the storage medium components is 20 mm; however, this is not required. According to another and/or alternative non-limiting aspect of the invention, $3/8 \times$No. 8 mesh size storage medium components can be used; however, this is not required. As such, a $3/8 \times$No. 8 mesh size provides improved compaction and water storage properties. The amount of storage medium components used can be selected based on the amount of water to be stored. For example, in one non-limiting arrangement, for every 50 gallons of water to be treated by the storage medium components, 1 cubic yard of LWA can be used; however, this is not required. The LWAs have a hydraulic conductivity that allows for fast free drainage and has a high angle of internal friction of greater than about 30-60 degrees (e.g., 40 degrees) that provides strength and stability. The LWAs can remove or reduce amounts of phosphorus and arsenic due to its outer layer charge. The LWAs are a good medium for aerobic digestion of runoff contaminants; however, this is not required.

The dimensions and shape of the porous storage medium layer can vary according to the size and shape of the site in which the surface water mitigation structure is to be used. Similarly, the dimensions and shape of the porous storage medium layer can be selected based on desired flow rates and quantity of water to be treated and/or filtered. Generally, the porous storage medium layer is relatively thin compared to its lateral dimension (i.e., its area). In non-limiting arrangements, the ratio of depth to surface area is typically at least 1:100 (and all values and ranges therebetween), more typically at least 1:50, and still more typically at least 1:20; however, this is not required. As can be appreciated, other ratios can be used based on the desired application. The thickness of the porous storage medium layer is generally greater than the thickness of the one or more permeable layers; however, this is not required. In one non-limiting arrangement, the thickness ratio of the one or more permeable layers to the porous storage medium layer is generally 1:1.5 to 1:1000 (and all values and ranges therebetween), and typically 1:2 to 1:20, and more typically 1:3 to 1:10.

The porous storage medium layer can include a flow gradient wherein the porosity at or near the top is substantially greater than the porosity at or near the bottom surface; however, this is not required. As such, the porosity variation can be used to effect the hydraulic gradient or pressure gradient for the purpose of forcing water downward and through the porous storage medium layer; however, this is not required.

Contaminated water entering the porous storage medium layer is designed to be temporarily retained within the porous storage medium layer. Runoff from the overlying one or more permeable layers enters into the porous storage medium layer. The porous storage medium layer can be designed to be an absorbent layer so as to facilitate the activity of one or more remediating agents provided therein and to allow the now-captured water to chemically, physically and/or biologically digest contaminants while the water is contained in the porous storage medium layer. In one non-limiting embodiment, the porous storage medium layer treats the stored water for a mean retaining time of at least about 0.1 days, typically at least about 0.5 days, more typically at least about 1 day, still more typically at least about 3-5 days, and even more typically at least about 5-12 days; however, other time periods can be used. In one specific embodiment, the water is retained in the porous storage medium layer for about 3-8 days (e.g., 6 days); however, this is not required. In addition to the biological digestion of contaminants, oxidation reactions and/or other aerobic conversions of some contaminants may occur in the porous storage medium layer.

The porous storage medium layer can include a watertight and/or impermeable material (e.g., plastic sheet or board, waterproof fabric, vinyl sheet, etc.) on one or more sides of the porous storage medium layer, thereby forming water-impermeable sides of the porous storage medium layer; however, this is not required. The watertight and/or impermeable material along the sides of the porous storage medium layer can prevent the flow of water from flowing out the sides of the porous storage medium layer and only allow the water to flow into the top of the porous storage medium layer and out the bottom of the porous storage medium layer and out any controlled side openings in the porous storage medium layer; however, this is not required. As can be appreciated, the watertight and/or impermeable material (e.g., plastic sheet or board, waterproof fabric, vinyl sheet, etc.) can also or alternatively extend along on one or more sides of the one or more permeable layers; however, this is not required.

According to another and/or alternative non-limiting aspect of the invention, the porous storage medium layer can serve the purpose of a support layer and/or a collection basin; however, this is not required. In yet another and/or alternative non-limiting aspect of the invention, the porous storage medium layer can support the growth of microbes (i.e., remediating agents) in void spaces and internal particle cracks; however, this is not required. As such, additional air, water and/or nutrients can be supplemented into the porous storage medium layer for the purpose of supporting and/or encouraging the growth and activity of the one or more microbes provided therein; however, this is not required.

According to another and/or alternative non-limiting embodiment of the present invention, the porous storage medium layer can include a mixture of one or more expanded lightweight components and one or more biological agents (e.g., microbes, etc.); however this is not required. The porous storage medium layer can include one or more types of microbes. The amount or concentration of the two or more types of microbes (when used) can be the same or different. According to another and/or alternative non-limiting embodiment of the present invention, the porous storage medium layer can include about 5 to about 95 wt. % of a first storage medium component (and all values and ranges therebetween), about 0 to about 85 wt. % of a second storage medium component (and all values and ranges therebetween), about 0.1 to about 30 wt. % of a first remediating agent (e.g., microbe, etc.) (and all values and ranges therebetween), about 0 to about 30 wt. % of a second remediating agent (e.g., microbe, etc.) (and all values and ranges therebetween), and less than about 10 wt. % of an additive (and all values and ranges therebetween); however, this is not required. According to another and/or alternative non-limiting embodiment of the present invention, the porous storage medium layer can include about 10 to about 80 wt. % of a first storage medium component, about 10 to about 80 wt. % of a second storage medium component, about 1 to about 30 wt. % of a first remediating agent (e.g., microbe, etc.), about 1 to about 30 wt. % of a second remediating agents (e.g., microbe, etc.), and less than about 10 wt. % of an additive; however, this is not required. Non-limiting additives that can be used in the porous storage medium layer include acids, bases, oxidants, surfactants, vitamins, nutrients, chelants, and/or nanomaterials. One or more of these additives can be post added through the permeable capstone layer to meet mitigation needs in response to specific contamination mitigation requirements.

In one non-limiting embodiment, the porous storage medium layer is composed of approximately 60-99 vol. % (and all values and ranges therebetween) storage medium component; however, this is not required. The storage medium component can be selected to provide improved water retention characteristics, strength characteristics, and/or microbial growth support characteristics; however, this is not required. The average particle size of the storage medium component can be at least 0.1 mm in diameter;

however, this is not required. The microbes in the porous storage medium layer constitute at least 1 vol. % of the dry porous storage medium layer and generally about 2-20 vol. % of the dry porous storage medium layer; however, this is not required. In the above-described non-limiting embodiment, the porous storage medium layer provides a flow rate of the runoff in the porous storage medium layer of about 0.001-0.5 feet per second per square foot of surface area and all values and ranges therebetween (e.g., 0.020 feet per second per square foot of surface area). One or more additives may be optionally added to the porous storage medium layer to provide improved water retention, strength, and/or microbial growth support characteristics; however, this is not required. The porous storage medium layer provides a high contaminant removal rate due to the retention time of the contaminated water within the porous storage medium layer.

According to another and/or alternative non-limiting aspect of the present invention, the porous storage medium layer can be impregnated with one or more biological agents prior to and/or after the one or more permeable layers are laid on or otherwise positioned on the top of the porous storage medium layer. As can be appreciated, additional microbes can be added to the porous storage medium layer after the one or more permeable layers are laid on or otherwise position on the top of the porous storage medium layer. In one non-limiting embodiment, the porous storage medium layer includes 1-5 different types of microbes. The one or more microbes can be class 3 naturally occurring microbes; however, this is not required.

According to another and/or alternative non-limiting aspect of the invention, the one or more microbes in the porous storage medium layer can be selected for the removal of petroleum-based contaminants (e.g., hydrocarbons) from the runoff. As such, the microbes can include bacteria that can consume hydrocarbons (e.g., oil, grease, gasoline, etc.) and convert it into carbon dioxide, water, and cellular material, as illustrated by the following reaction:

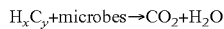

wherein x and y are numbers defining the contaminant hydrocarbon; however, this is not required. Upon partial or full removal of the contaminants (e.g., hydrocarbons, etc.) from the runoff, the remaining microbes in the porous storage medium layer can expire due to lack of "food" or become dormant; however, this is not required.

In non-limiting embodiments, the microbes in the porous storage medium layer can be selected to treat certain types of contaminants in the runoff; however, this is not required. While the present non-limiting example relates to the removal of hydrocarbons from runoff, the present application is amenable to other like applications, such as, for example, the removal of perchlorate, nitrate, salts, organic compounds, inorganic compounds, metals, etc., from runoff; however, this is not required. As can be appreciated, one or more contaminants can be removed sequentially with the use of one type of microbe. For example, the microbes can consume an organic contaminant (e.g., hydrocarbon, etc.) which can lead to a chemical reaction that removes salts; however, this is not required.

In another and/or alternative non-limiting aspect of the invention, the one or more microbes used in the porous storage medium layer can optionally include those that are: 1) naturally occurring, 2) non-genetically modified, and/or 3) those that can be concentrated in solutions; however, this is not required. In one specific, non-limiting embodiment, two microbes can be used, wherein the first microbe can be selected to be a petroleum distillate and wherein the second microbe can be selected to be a phosphate distillate; however, this is not required. The petroleum distillate microbe can be selected from a group of petroleum-degrading bacteria consisting of *Micrococcus, Arthrobacter, Rhodococcus*, etc. The phosphate distillate microbe can be selected from a group of phosphate-solubilizing bacteria consisting of *Pantoea aggiomerans, Microbacterium laevaniformans, Pseudomonas putida*, etc. As can be appreciated, the type of microbe can be selected based on the desired contaminant to be removed. Non-limiting examples of such microbes include *Achromobacter, Asper gillys, Bacillus, Candida, Cladosporium, Corynebacterium, Myrothecium, Punicillium, Phialophora, Phodothorula, Streptomyces, Trichoderma*, and/or a blend of other aerobic and/or anaerobic bacteria.

In another and/or alternative non-limiting aspect of the invention, the one or more microbes can be concentrated in solutions that permit the microbes to be added to the porous storage medium layer: 1) after it has been laid in the ground surface and prior to the one or more permeable layers being laid on or otherwise positioned on the top of the porous storage medium layer; and/or 2) through the one or more permeable layers after the one or more permeable layers have been laid on or otherwise positioned on the top of the porous storage medium layer; however, this is not required. The solution of microbes can include one or more microbes (aerobic, anaerobic, and/or facultative) in water; however, this is not required. The solution can contain one or more additives to support the growth of said microbes; however, this is not required. The solution can be prepared by soaking the microbes in water for from about 0.1 hours to about 24 hours or more, more typically about 0.5 hours to about 15 hours, and still more typically about 1 hour to about 10 hours; however, this is not required. In one specific embodiment, the microbes can be soaked in water for 3-8 hours; however, this is not required. In one non-limiting example, about 100 grams of microbes are soaked in 10 gallons of water for 5-7 hours. The resulting solution can be diluted (100-2,000 parts of concentrate to 1,000,000 parts of water, etc.) to form the solution that is to be used to populate the porous storage medium layer with microbes; however, this is not required. The concentration of microbes is typically from about 50 ppm to about 500 ppm (and all values and ranges therebetween), more typically from about 100 ppm to about 400 ppm, and still more typically from about 150 ppm to about 350 ppm. In specific embodiments, about 200-270 ppm is used; however, this is not required. As can be appreciated, some types of microbes can be applied to the porous storage medium layer when in dry form. Dry microbes can be sprinkled on the porous storage medium layer and thereafter liquid can be applied to the porous storage medium layer to hydrate the microbes and charge the porous storage medium layer. As can also be appreciated, the dry microbes could also or alternatively be applied to the top surface of the one or more permeable layers and thereafter liquid can be applied to the one or more permeable layers to cause the microbes to hydrate, pass into, and charge the porous storage medium layer.

One non-limiting advantage to using such microbes in the porous storage medium layer is that, rather than consuming energy to function as a filtration system of the contaminants in the water, the microbes produce a net gain of energy, specifically as they release energy (e.g., heat, etc.) that is stored in the bonds of organic compounds (e.g., the bonds within hydrocarbons, etc.), which produced energy could be collected and reused; however, this is not required.

Introducing non-genetically modified microbes into the storage medium component (i.e., the LWA) allows the entire surface water mitigation structure system to function as a septic system and is capable of removing contaminants from water without the use of any piping or tanks.

According to one non-limiting aspect of the present invention, the surface water mitigation structure of the present invention is capable of removing contaminants and/or pollutants from water (e.g., storm water runoff, waste water runoff, etc.) by subjecting the water to a multi-layered filtration and treatment system. After the water has been treated by the surface water mitigation structure, the treated water can be discharged to the ground, the surface, and/or a drainage system.

The flow rate of water through the surface water mitigation structure can be increased in a number of ways, including: 1) increasing the permeability of the one or more permeable layers; 2) reducing the area of the porous storage medium layer; 3) reducing the absorbency of the porous storage medium layer; and/or, 4) reducing the amount of remediating agents (e.g., microbes, etc.) in the porous storage medium layer.

The contaminant removal can be increased in a number of ways, including: 1) reducing the permeability of the one or more permeable layers; 2) increasing the area of the porous storage medium layer; 3) increasing the absorbency of the porous storage medium layer; 4) increasing the amount of microbes in the porous storage medium layer; 5) increasing the quality of microbes; and/or 6) optimizing the environment for the microbes, e.g. aerate, add limiting micronutrient, etc.

According to another and/or alternative non-limiting aspect of the present invention, the unique structure of the surface water mitigation structure permits air to circulate through both the one or more permeable layers and the porous storage medium layer upper layer; however, this is not required. As such, the microbes in the porous storage medium layer can be supplied with a continuous supply of fresh air to aid in the digestion of the contaminants.

According to another and/or alternative non-limiting aspect of the present invention, the surface water mitigation structure of the present invention can be used as an environmentally friendly system to treat surface water runoff so as to reduce or eliminate harm to the environment from the surface water runoff. The surface water mitigation structure can also be used to reduce the amount of surface water that is processed by a water treatment plant. Currently, many impervious paved surfaces in an urban area include drains that direct surface water from a rain shower or the like to a water treatment plant. During periods of heavy rain, the water treatment plant can be overwhelmed due to a sudden influx of surface water that has drained from paved surfaces. During such times, the surface water is sometimes diverted into the environment due to the overcapacity of the water treatment plant. The surface water mitigation structure of the present invention can be used to eliminate the need to treat surface water that has fallen on the surface of the water mitigation structure by a water treatment plant, thereby reducing the volume of surface water needed to be treated by a water treatment plant; however, this is not required. Large impervious paved areas such as parking lots, etc., that include the surface water mitigation structure of the present invention can reduce or eliminate the need for drains or retention ponds; however, this is not required. For example, a parking lot, pathway, etc., that includes the surface water mitigation structure of the present invention can be absent drains or retention ponds. A curb and/or other type of barrier perimeter can optionally be positioned about all or a portion of a perimeter of a surface that includes the surface water mitigation structure of the present invention so as to retain surface water on the surface water mitigation structure until such water flows through the surface water mitigation structure; however, this is not required. The height of such curb and/or other type of barrier perimeter (when used) above the top surface of the surface water mitigation structure is non-limiting (e.g., 0.25-10 inches and all values and ranges therebetween). As can be appreciated, when a curb and/or other type of barrier perimeter is used in conjunction with the surface water mitigation structure of the present invention, a raised drain located on the surface water mitigation structure and/or a drain located adjacent to the curb and/or other type of barrier perimeter to drain surface water on the surface of the surface water mitigation structure when the surface water mitigation structure cannot process the surface water at a fast enough rate; however, this is not required. For example, one or more raised drains that have a top surface elevated at some distance above the top surface of the surface water mitigation structure (e.g., 0.5-6 inches and all values and ranges therebetween) and generally at the same height or lower than the top surface of the curb and/or other type of barrier perimeter can be used to drain the surface water from the top surface of the surface water mitigation structure when the height of the water on the surface of the surface water mitigation structure rises to the height of the top surface of the one or more drains. In another or additional arrangement, one or more drains can be located adjacent to the curb and/or other type of barrier perimeter so as to receive surface water that has fallen on the surface water mitigation structure and has overflowed the curb and/or other type of barrier perimeter of the surface water mitigation structure. In these examples, the surface water mitigation structure is used to process all of the surface water that has fallen on the surface water mitigation structure except in situations where the rainfall rate is too great for the surface water mitigation structure to process all of the surface water. In such situations, the excess water can be captured by a drain; however, the amount of water that flows into the drain is reduced by the amount of water that is processed by the surface water mitigation structure.

According to one non-limiting aspect of the present invention, a method of producing a surface water mitigation structure can include the steps of: 1) selecting one or more base materials for use in a permeable composite capstone layer; 2) selecting one or more binders to bind the one or more base materials of the permeable composite capstone layer; 3) mixing the one or more base materials with the one or more binders until the one or more base materials are wetted; 4) selecting one or more storage medium components for the porous storage medium layer; 5) digging up or otherwise preparing a ground surface to create a prepared surface or ground cavity for receiving the porous storage medium; 6) pouring/inserting the porous storage medium onto the prepared ground surface and/or into the ground cavity to form a porous storage medium layer; 7) optionally impregnating the porous storage medium layer with one or more microbes prior to forming the permeable composite capstone layer on top of the porous storage medium layer; 8) placing the non-fully cured or non-fully set mixture of base materials and one or more binders of the permeable composite capstone layer on top of the porous storage medium layer; 9) spreading the non-fully cured or non-fully set mixture of base materials and one or more binders of the permeable composite capstone layer over the top surface of the porous storage medium layer; 10) optionally flattening a top surface of the permeable composite capstone layer prior to the fully curing or fully setting of the one or more binders; and 11) allowing the one or more base materials and one or more binders of the permeable composite capstone layer to substantially or fully cure or set to form a rigid permeable composite capstone layer. The curing or setting of the one or more binders of the permeable composite capstone layer results in the formation of a durable and rigid permeable composite capstone layer. The curing or setting of the one or more binders can optionally result in the bonding of the permeable composite capstone layer to the top surface of the porous storage medium layer. In one non-limiting embodiment, after the curing or setting of the one or more binders, the permeable composite capstone layer becomes a rigid structure that can support desirable loads without breaking or excessively deflecting under such loads.

After the setting and/or curing of the one or more binders of the permeable composite capstone layer, one or more powdered microbes and/or one or more microbes via solution can be optionally added to the top surface of the permeable composite capstone layer so as to initially or further charge the porous storage medium layer with the one or more remediating agents.

According to another non-limiting aspect of the present invention, the surface water mitigation structure can comprise at least three layers: 1) a flexible permeable layer, 2) a permeable support layer, and 3) a porous storage medium layer that can absorb and/or hold water that has passed through the permeable layer and permeable support layer. As can be appreciated, the flexible permeable layer can be optionally bonded to the permeable support layer so as to eliminate one independent layer in the system; however, this is not required.

According to another non-limiting aspect of the present invention, a method of producing a surface water mitigation structure can include the steps of: 1) providing a flexible permeable layer; 2) providing a permeable support layer; 3) selecting one or more storage medium components for the porous storage medium layer; 4) digging up or otherwise preparing a ground surface to create a prepared surface or ground cavity for receiving the porous storage medium; 5) pouring/inserting the porous storage medium onto the prepared ground surface and/or into the ground cavity to form a porous storage medium layer; 6) optionally impregnating the porous storage medium layer with one or more microbes prior to inserting the flexible permeable layer and/or the permeable support layer on top of the porous storage medium layer; 7) placing the permeable support layer on top of the porous storage medium layer; and 8) placing the flexible permeable layer on top of the permeable support layer. After the permeable support layer is placed on top of the porous storage medium layer and/or after the flexible permeable layer on top of the permeable support layer, one or more powdered microbes and/or one or more microbes via solution can be optionally added to the top surface of the flexible permeable layer and/or the permeable support layer so as to initially or further charge the porous storage medium layer with the one or more remediating agents.

According to another and/or alternative non-limiting aspect of the present invention, a method of treating and/or filtering runoff can include the steps of: 1) capturing contaminated runoff on a surface via the one or more permeable layers, 2) treating the captured runoff in a porous storage medium layer that includes one or more remediating agents, and 3) allowing the treated water to disperse in the ground about the mitigation structure of the present invention. As can be appreciated, the one or more permeable layers can also function as an initial filtration system for the runoff to prevent large objects or materials from passing through the one or more permeable layers and into the porous storage medium layer.

One non-limiting object of the present invention is the provision of an improved surface water mitigation structure that can effectively treat and remove pollutants, contaminants, etc. from surface water runoff.

Another and/or alternative non-limiting object of the present invention is the provision of an improved surface water mitigation structure where the entire system does not require any piping and/or tanks.

Another and/or alternative non-limiting object of the present invention is the provision of an improved surface water mitigation structure wherein any contaminated water that enters the surface water mitigation structure can be processed naturally.

Another and/or alternative non-limiting object of the present invention is the provision of an improved surface water mitigation structure wherein one or more microbes embedded within said surface water mitigation structure can be used to remove water contaminants.

Another and/or alternative non-limiting object of the present invention is the provision of an improved surface water mitigation structure wherein the only or primary by-products from such contaminated water runoff treatment are clean water and carbon dioxide.

Another and/or alternative non-limiting object of the present invention is the provision of an improved surface water mitigation structure wherein chlorine is not used in the processing of contaminated water runoff.

Another and/or alternative non-limiting object of the present invention is the provision of an improved surface water mitigation structure wherein the contaminated runoff is captured and processed before it is released to a sewer, groundwater and/or the ground surrounding the improved surface water mitigation structure.

Yet another and/or alternative non-limiting object of the present invention is the provision of an improved surface water mitigation structure wherein the entire system is able to support substantial loads, collect water, store water, and treat/remove contaminants.

Still yet another and/or alternative non-limiting object of the present invention is the provision of an improved surface water mitigation structure which is capable of treating water contaminants chemically, physically, and/or biologically.

Another and/or alternative non-limiting object of the present invention is the provision of an improved surface water mitigation structure that does not require any piping or tanks.

Still another and/or alternative non-limiting object of the present invention is the provision of an improved surface water mitigation structure that functions as both a support layer and as a collection drain.

These and other objects, features and advantages of the present invention will become apparent from the subsequent description taken in conjunction with the accompanying drawings.

BRIEF DESCRIPTION OF THE DRAWINGS

Reference may now be made to the drawings, which illustrate various non-limiting embodiments that the invention may take in physical form and in certain parts and arrangement of parts wherein.

DETAILED DESCRIPTION OF THE NON-LIMITING EMBODIMENTS

Figure 1:
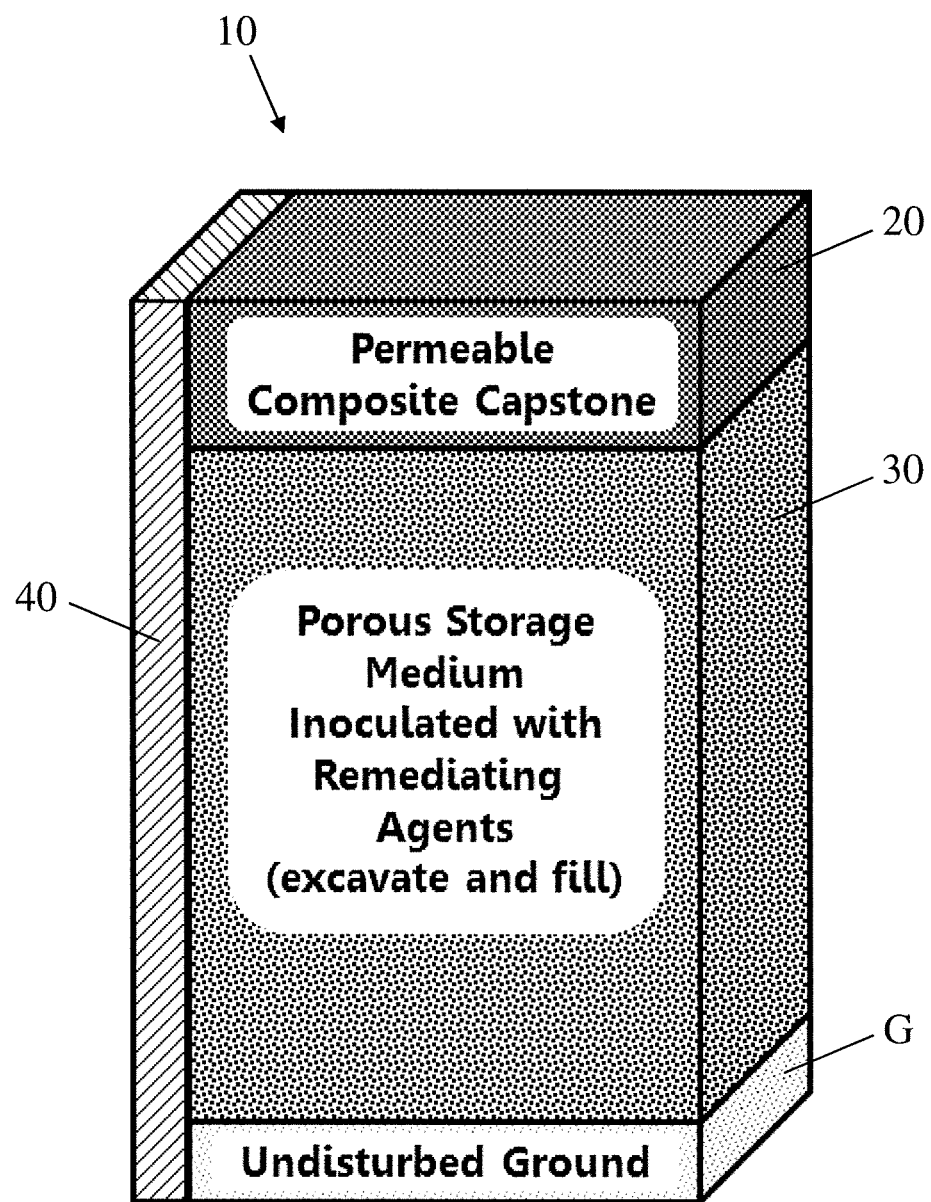
FIG. 1 is a cross-sectional perspective illustration of one surface water mitigation structure according to one non-limiting aspect of the present invention.

A more complete understanding of the articles/devices, processes and components disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 10% of the indicated number.

Percentages of elements should be assumed to be percent by weight of the stated element, unless expressly stated otherwise.

Referring now to the drawings, wherein the showings are for the purpose of illustrating at least one non-limiting embodiment of the invention only and not for the purpose of limiting the invention, FIGS. 1-10 illustrate non-limiting surface water mitigation structures in accordance with the present invention.

In the drawings, like reference numerals refer to like elements throughout, and the various features are not necessarily drawn to scale. The singular forms "a," "an," and "the" include plural referents unless the context clearly dictates otherwise. As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

The present invention is directed to a surface water mitigation structure that can be used as a water treatment and/or filtration system which is durable enough to be used in outdoor applications (e.g., roadways, parking lots, sidewalks, cart paths, bicycle paths, urban tree surrounds, horse stalls, drainage basins, animal shelters, animal stalls, barns, stables, kennels, etc.), and which surface water mitigation structure and/or topping has a multi-layered structure that includes remediating agents used to at least partially treat contaminants that flow through the surface water mitigation structure.

As illustrated in FIG. 1, the surface water mitigation structure 10 includes at least two layers, namely a) a permeable composite capstone layer 20 and b) a porous storage medium layer 30. The permeable composite capstone layer 20 is positioned above the porous storage medium layer 30, and the porous storage medium layer 30 is positioned in, on, or above a ground surface G. As illustrated in FIG. 1, a cavity has been formed in a portion of the ground surface and the porous storage medium layer 30 has been placed in the cavity and on top of the undisturbed ground to partially or fully fill the cavity. The permeable composite capstone layer 20 is configured to support substantial loads while also being pervious enough to allow top water runoff to pass through the permeable composite capstone layer. The porous storage medium that forms the porous storage medium layer 30 is configured to absorb and/or hold water that has passed through the permeable composite capstone layer 20. The porous storage medium layer is designed to at least contain and/or be inoculated with one or more remediating agents that are designed to break down contaminants in the runoff that has passed through the permeable composite capstone layer. The porous storage medium layer is also typically designed to retain and/or absorb the runoff for a period of time (e.g., 2 minutes to 10 days and all values and ranges therebetween) to allow the remediating agents to break down the contaminants before the runoff enters the surrounding environment. In one non-limiting embodiment, the average residence time of the runoff in the porous storage medium layer is at least about 5 minutes, and typically at least about 10 minutes.

Figure 2:
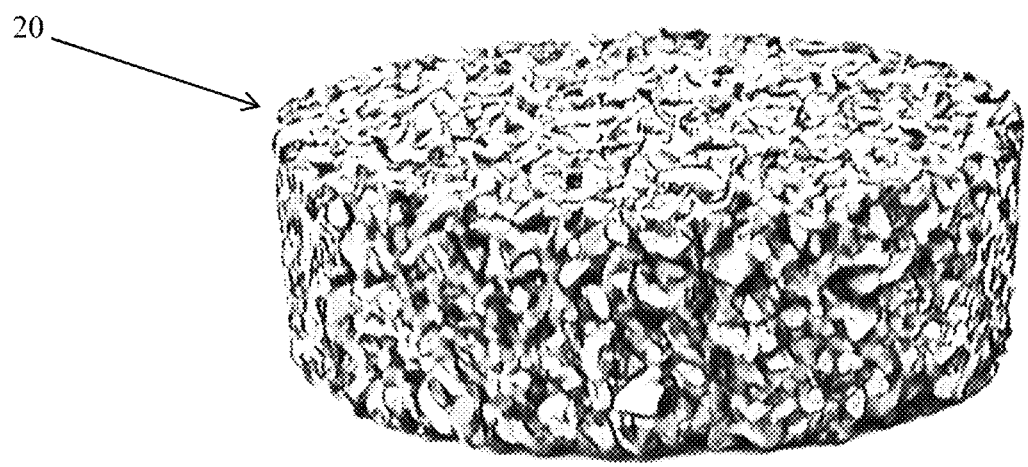
FIG. 2 is a perspective illustration of a section of the permeable composite capstone layer of FIG. 1.
Figure 3:
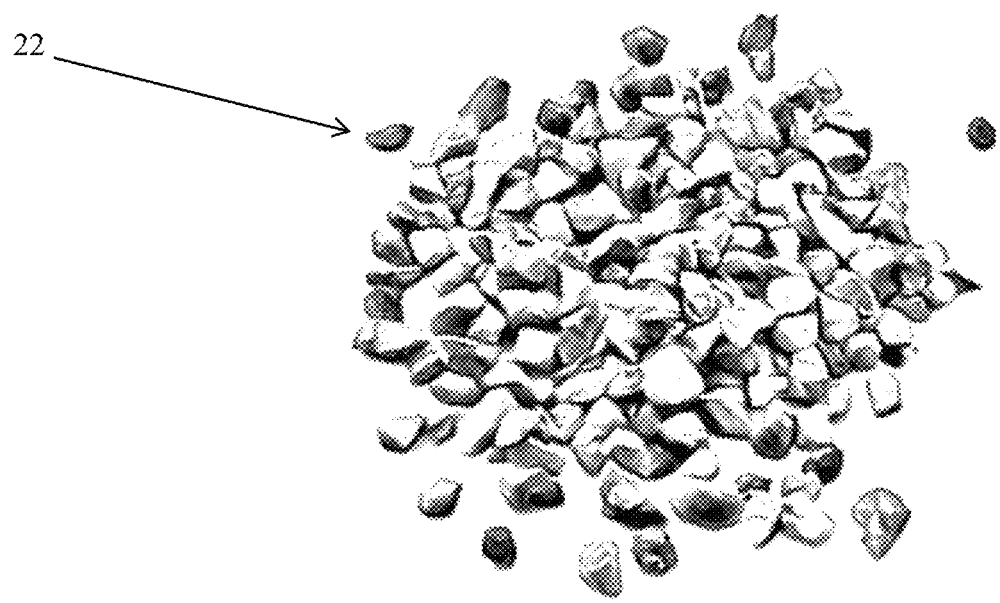
FIG. 3 is a perspective illustration of one non-limiting base material that can be used to at least partially form the permeable composite capstone layer of FIG. 1.

Referring now to FIGS. 1-4, the permeable composite capstone layer 20 can be formed from a base material 22 formed of particles of natural materials (e.g., limestone, shale, slate, sandstone, quartz, feldspar, dolomite, obsidian, mica, diorite, flint, granite, stone, metal, etc.) and/or one or more man-made materials (e.g., glass, rubber, ceramic, plastic, recycled concrete, recycled asphalt, expanded shale, expanded slate, recycled plastic, recycled metal, etc.) which are bonded together with one or more binders (e.g., epoxy resin, urethane or polyurethane resin, acrylic resin, styrene butadiene resin, silicone resin, vinylester resin, phenolic resin, polyester resin or fiberglass resin, etc.). FIG. 3 illustrates granules of base material 22 that can be used to form the permeable composite capstone layer 20. FIG. 2 illustrates a sample of a permeable composite capstone layer 20 wherein the base materials are bonded together by a binder to form a porous, durable and rigid structure. In one specific, non-limiting example, the permeable composite capstone layer includes recycled concrete, granite and/or stone and recycled rubber bonded together with urethane binder (e.g., urethane or polyurethane resin). The average particle size of the base material is 0.5-100 mm (and all values and ranges therebetween) based on ISO 14688-1:2002, and typically about 1-60 mm based on ISO 14688-1:2002, and more typically 3-30 mm based on ISO 14688-1:2002 based on ISO 14688-1:2002. The base material generally constitutes 55-99.5 wt. % (and all values and ranges therebetween) of the permeable composite capstone layer, and the binder generally constitutes 0.5-45 wt. % (and all values and ranges therebetween) of the permeable composite capstone layer. The permeable composite capstone layer can also include one or more additives.

The permeable composite capstone layer is generally poured and then spread on the top surface of the porous storage medium layer 30 prior to the binder fully curing or setting. Once the binder has set and/or cured, a rigid permeable composite capstone layer is formed. Generally, the top surface of the permeable composite capstone layer is formed to be generally flat prior to the binder fully setting and/or curing. In such an operation, the bottom surface of the permeable composite capstone layer is generally non-flat and rough; however, this is not required. It can be appreciated that for smaller areas (e.g., less than 10 ft.$^2$), preformed sections of permeable composite capstone layer can be formed and fully cured and then later inserted on top of the porous storage medium layer. However, for surface areas larger than 10 ft.$^2$, the permeable composite capstone layer is typically poured and spread on the top surface of the porous storage medium layer prior to the binder fully setting and/or curing.

Figure 9:
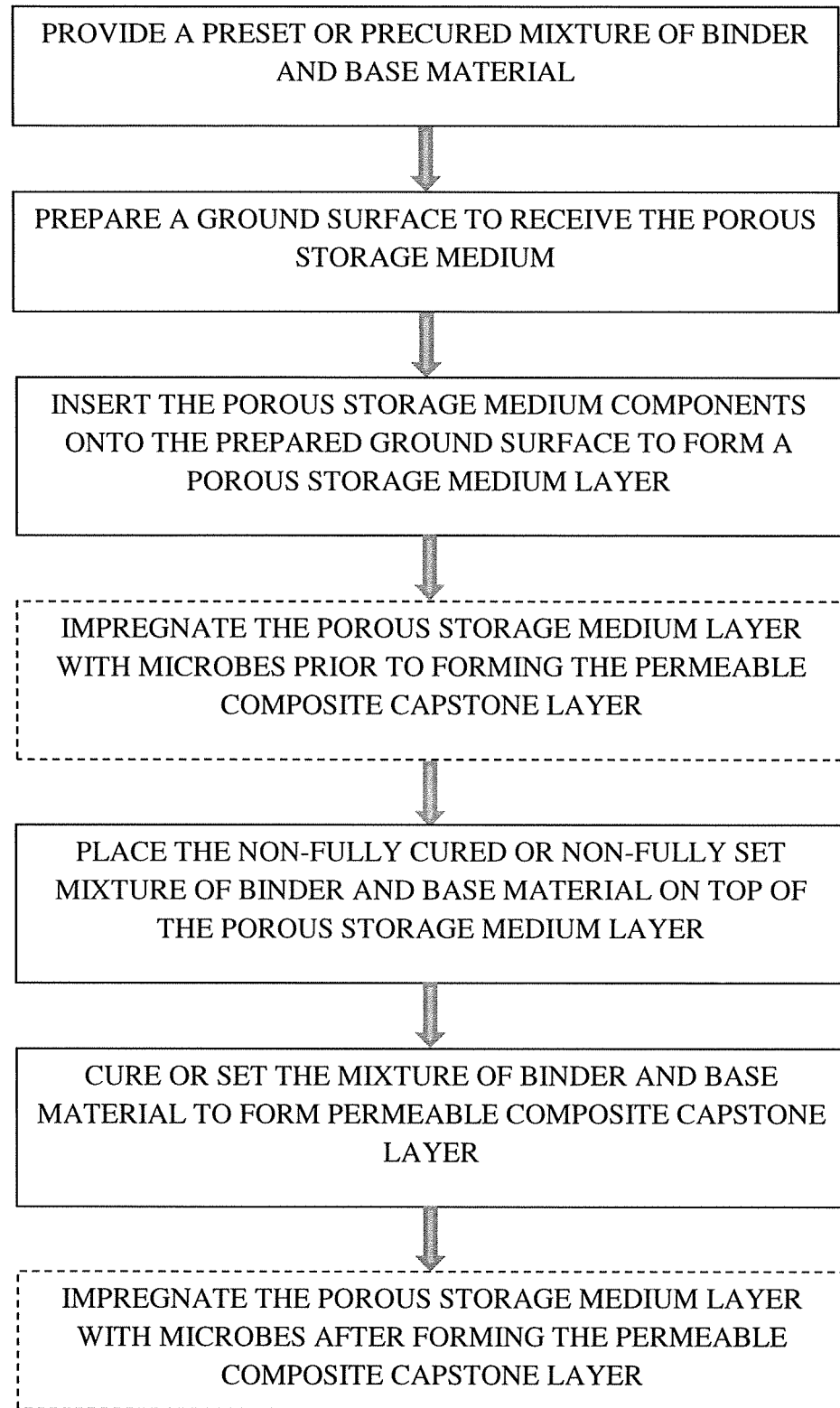
FIG. 9 is a method for forming a surface water mitigation structure.
Figure 10:
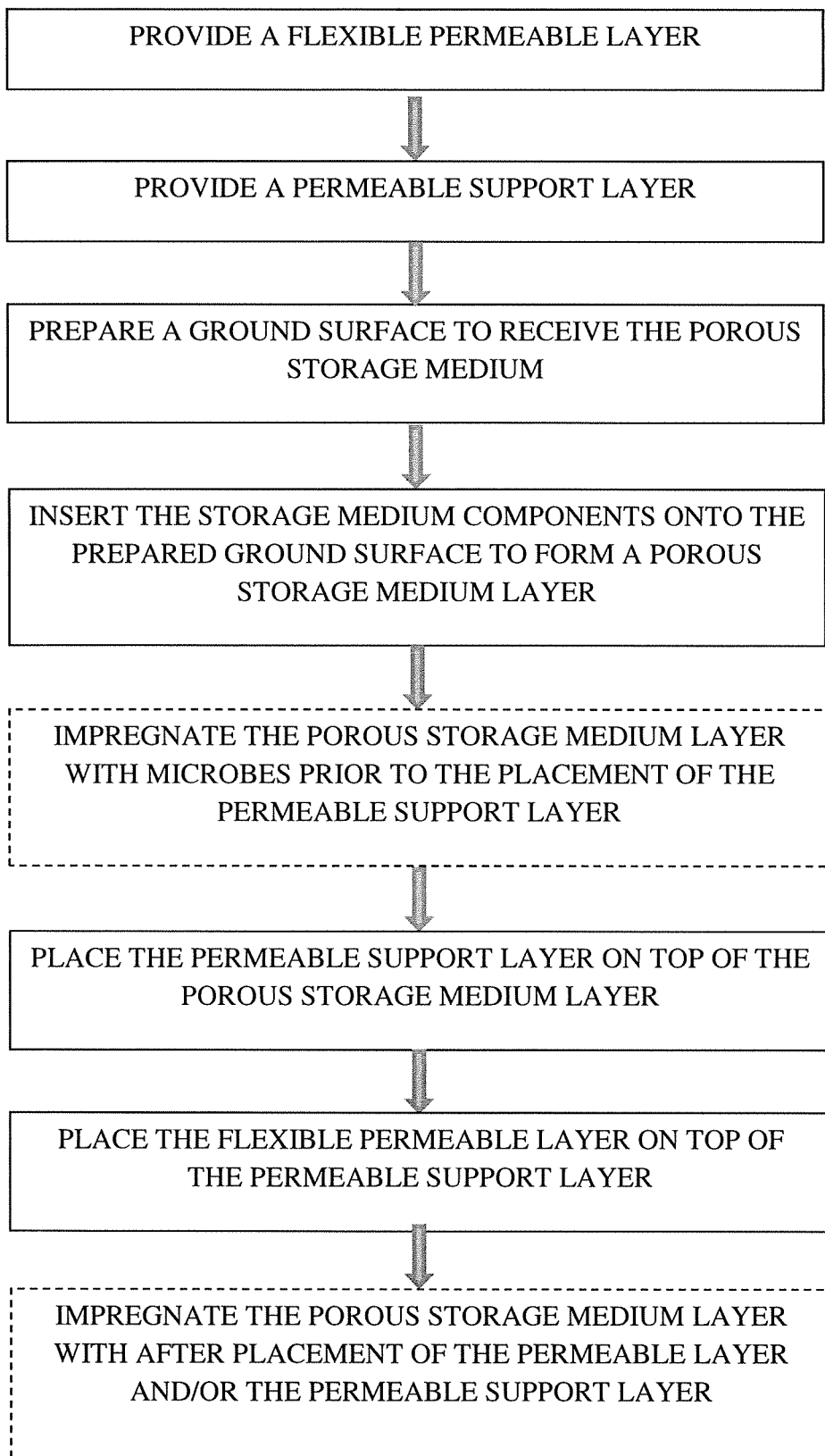
FIG. 10 is another method for forming a surface water mitigation structure.

FIG. 9 illustrates a non-limiting method for forming a surface water mitigation structure 10. A mixture of non-fully cured or set binder and base material is provided. The mixture can be formed prior to, during, or after the formation of the porous storage medium layer. The ground surface is prepared for the porous storage medium layer. The type of ground preparation is non-limiting. One type of ground preparation is digging a hole, trench, cavity, etc. in the ground. Another type of ground preparation is grading and/or clearing the ground surface. As can be appreciated, other types of ground preparation can be used. After the ground preparation, the porous surface medium components are poured onto or otherwise inserted in or laid on the prepared ground surface. Prior to, during, and/or after the porous surface medium components being placed on the prepared ground surface, microbes can be applied to the porous surface medium components. The porous surface medium components can be pretreated with microbes, and/or microbes can be added to the porous surface medium components by pouring a liquid microbe solution onto the porous surface medium components. As can be appreciated, other or additional methods can be used to apply microbes to the porous surface medium components. After the porous surface medium components are applied to the prepared ground surface and optionally spread out on the ground surface, the mixture of binder and base material is applied on top of the porous surface medium components. For small areas (e.g., no more than 10'×10'), a capstone layer can optionally be pre-formed and then be placed over the porous surface medium components. However, generally, a pre-set or pre-cured mixture of binder and base material is poured over the porous surface medium components and then spread over the porous surface medium components to obtain a desired thickness and top surface profile. Typically, the pre-set or pre-cured mixture of binder and base material is applied directly to the top surface of the porous surface medium components; however, this is not required. After the pre-set or pre-cured mixture of binder and base material is applied over the porous surface medium components, the mixture of binder and base material is allowed to substantially or fully set or cure, thereby forming the rigid, permeable composite capstone layer. After the binder and base material are substantially or fully set or cured, the porous surface medium components can be treated with microbes. Such treatment is generally accomplished by pouring a liquid microbe solution onto the top surface of the rigid, permeable composite capstone layer and allowing the solution to flow through the rigid, permeable composite capstone layer and then charge the porous surface medium components with the microbes. As can be appreciated, other or additional methods can be used to apply microbes to the porous surface medium components the porous surface medium components.

Figure 4:
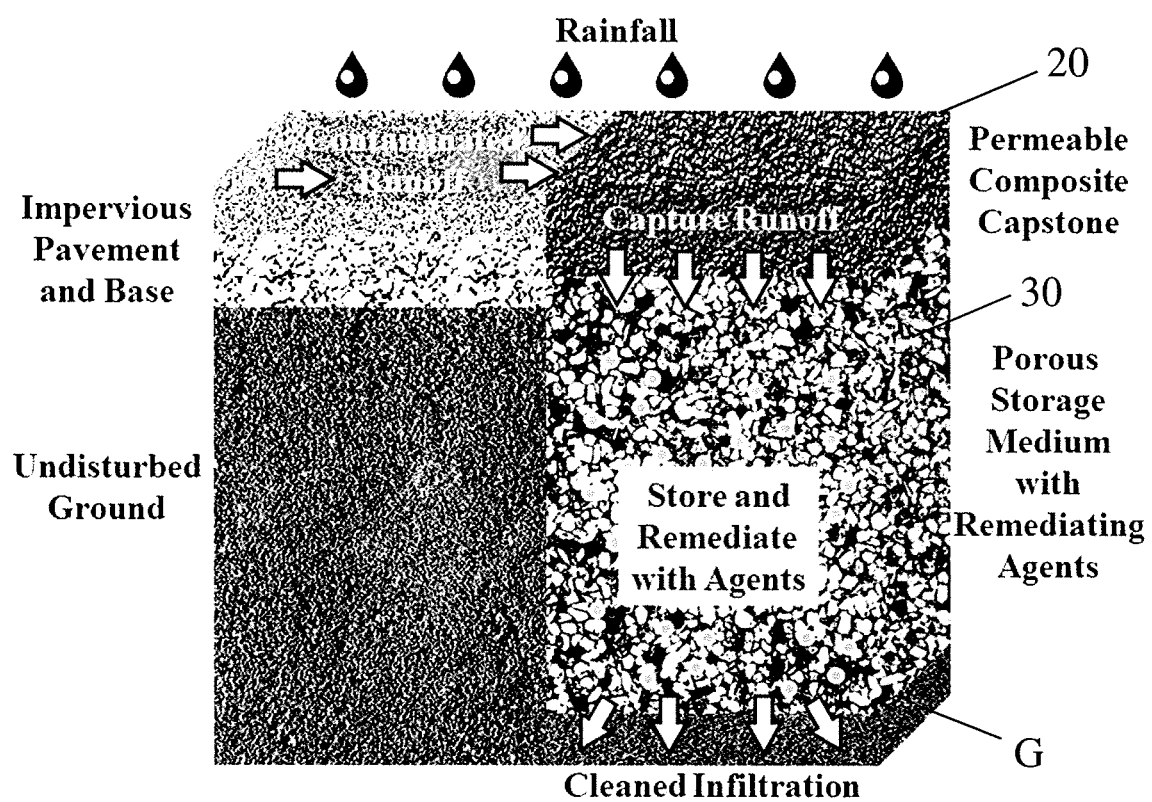
FIG. 4 is a perspective illustration of a comparison of rain fall on a prior art paved surface and the surface water mitigation structure of FIG. 1.

Generally, the permeable composite capstone layer is relatively thin compared to its surface area. In one non-limiting embodiment, the ratio of depth of the permeable composite capstone layer to the surface area of the permeable composite capstone layer is at least 1:50, and has an average thickness of at least 0.5 inch, typically about 0.5-8 inches (and all values and ranges therebetween), and more typically about 1-6 inches, and still more typically 1-4 inches. As illustrated in FIGS. 1 and 4, the thickness of the permeable composite capstone layer 20 is less than the thickness of the porous storage medium layer 30. The thickness ratio of the permeable composite capstone layer to the porous storage medium layer is generally 1:1.2 to 1:500 (and all values and ranges therebetween), and typically 1:3 to 1:15.

The permeable composite capstone layer is typically configured to be abrasion resistant, freeze/thaw resistant, and/or strong enough to support major loads (e.g., the weight of a person, car, truck, train, bus, etc.). In one non-limiting embodiment, the permeable composite capstone layer has a composition and thickness wherein a one-inch thick slab of cured permeable composite capstone layer having a length of two feet and a width of one foot can support a load on a top surface of the permeable composite capstone layer of at least 50 lbs./ft.$^2$ without breaking under such load, typically the permeable composite capstone layer has a composition and thickness wherein a one-inch thick slab of cured permeable composite capstone layer having a length of two feet and a width of one foot can support a load on a top surface of the permeable composite capstone layer of at least 100 lbs./ft.$^2$ without breaking under such load, more typically the permeable composite capstone layer has a composition and thickness wherein a one-inch thick slab of cured permeable composite capstone layer having a length of two feet and a width of one foot can support a load on a top surface of the permeable composite capstone layer of at least 200 lbs./ft.$^2$ without breaking under such load, and still more typically the permeable composite capstone layer has a composition and thickness wherein a one-inch thick slab of cured permeable composite capstone layer having a length of two feet and a width of one foot can support a load on a top surface of the permeable composite capstone layer of at least 500 lbs./ft.$^2$ without breaking under such load. In another non-limiting embodiment, the cured permeable composite capstone layer is a rigid layer that does not break or deflect more than 10% under a load on the top surface of the permeable composite capstone layer of at least 50 lbs./ft.$^2$ wherein the capstone layer is a slab having a thickness of one inch and having a length of two feet and a width of one foot, typically the permeable composite capstone layer is a rigid layer that does not break or deflect more than 5% under a load on the top surface of the permeable composite capstone layer of at least 50 lbs./ft.$^2$ wherein the capstone layer is a slab having a thickness of one inch and having a length of two feet and a width of one foot, and more typically the permeable composite capstone layer is a rigid layer that does not break or deflect more than 2% under a load on the top surface of the permeable composite capstone layer of at least 50 lbs./ft.$^2$ wherein the capstone layer is a slab having a thickness of one inch and having a length of two feet and a width of one foot.

The weight ratio of binder to base material in the permeable composite capstone layer is typically about 1:2 to about 1:16. In one specific embodiment, the weight ratio of binder to base material is 1:4 to 1:10. The permeable composite capstone layer is configured to allow water to pass through the permeable composite capstone layer at a rate of at least 1 inch of water per square foot per hour, and typically at least 2 inches of water per square foot per hour.

The porous storage medium layer 30 is configured to retain sufficient amounts of fluid to support remediating agent activity, yet durable enough to support loads of the permeable composite capstone layer. The porous storage medium layer can be made from one or more materials and associated void spaces. In non-limiting embodiments, the porous storage medium layer can include one or more storage medium components selected from the group consisting of shale, slate, expanded shale, and/or expanded slate. The average size of one or more storage medium components used to at least partially form the porous storage medium layer is about 0.10 mm to about 100 mm (and all values and ranges therebetween). The amount of storage medium components included in the porous storage medium layer is generally selected based on the amount of water to be stored or retained for a period of time in the porous storage medium layer.

Water and other liquids that enter the porous storage medium layer after passing through the permeable composite capstone layer are temporarily retained within the porous storage medium layer. The porous storage medium layer generally is designed to retain water and other liquids for at least about 0.1 day.

In one non-limiting arrangement, the thickness of the permeable composite capstone layer 20 is about 0.1-10 inches, typically 0.5-6 inches, and can with loads without cracking of 50-200,000 lbs./ft.$^2$ (and all values and ranges therebetween), typically 1000-100,000 lbs./ft.$^2$, more typically 5000-50,000 lbs./ft.$^2$, and still more typically 7500-20,000 lbs./ft.$^2$. In another or alternative non-limiting arrangement, the thickness of the porous storage medium layer 30 is about 0.2-100 ft., typically 0.3-50 ft., and more typically about 0.3-20 ft. The composition of the porous storage medium layer 30 is generally selected such that each ton (i.e., 2000 lbs.) of the porous storage medium layer can store about 10-200 gal. of water, typically 25-100 gal. of water, and more typically about 40-75 gal. of water.

The permeable composite capstone layer and/or the porous storage medium layer can optionally include a watertight and/or impermeable material 40 (e.g., plastic sheet or board, waterproof fabric, vinyl sheet, etc.) on one or more sides of the permeable composite capstone layer and/or the porous storage medium layer. The watertight and/or impermeable material can reduce or prevent water and other liquids from flowing out one or more of the sides of the permeable composite capstone layer and/or porous storage medium layer and only allow the water and other liquids to flow through the permeable composite capstone layer and into the top of the porous storage medium layer and out the bottom of the porous storage medium layer and out any controlled side openings in the porous storage medium layer; however, this is not required. The porous storage medium layer can serve the purpose of a support layer and/or a collection basin. The porous storage medium layer can optionally support the growth of remediating agents in the form of microbes. The porous storage medium layer can optionally include water and/or nutrients for the purpose of supporting and/or encouraging the growth and activity of the one or more microbes in the porous storage medium layer.

The porous storage medium layer can include one or more expanded lightweight storage medium components. One or more remediating agents are generally added to the porous storage medium layer. In one non-limiting configuration, the porous storage medium layer includes about 10 to about 99.9 wt. % of a first storage medium component, about 0 to about 89.9 wt. % of a second storage medium component, about 0.1 to about 30 wt. % of a first remediating agent, about 0 to about 30 wt. % of a second remediating agent, and less than about 10 wt. % of an additive. The dry porous storage medium layer is composed of approximately 65-98 vol. % storage medium components. The average particle size of the storage medium component is at least 0.2 mm in diameter; however, this is not required. The microbes in the porous storage medium layer constitute about 2-18 vol. % of the dry porous storage medium layer. The porous storage medium layer provides a flow rate of the runoff in the porous storage medium layer of about 0.001-1 feet per second per square foot of surface area (and all values and ranges therebetween). In one non-limiting embodiment, the expanded lightweight storage medium layer is formed from at least 50% wt. % expanded shale and/or expanded slate, and typically at least 75 wt. expanded shale and/or expanded slate.

Referring now to FIG. 4, there is a side-by-side comparison of how surface water is treated when contacting the top surface of a prior art paved surface (as shown on the right side of FIG. 4) and when contacting the top surface of the surface water mitigation structure 10 of the present invention (as illustrated on the left side of FIG. 4). When a liquid contacts the top surface of the prior art paved surface, the liquid stays on the top surface of the prior art paved surface until it is washed away, such as by rain. The runoff from the prior art paved surface either drains into a drain or runs off into the surrounding environment. If the drain is not connected to a sewer system, the runoff enters into the surrounding environment. Runoff that includes contaminants that flow into the surrounding environment can potentially damage the surrounding environment. In contrast, when such a liquid contacts the top surface of the permeable composite capstone layer 20 of the surface water mitigation structure 10, the liquid may partially or fully pass through the permeable composite capstone layer. If the liquid only partially passes through the permeable composite capstone layer (as when a significant amount of surface water such as from a rain storm falls on the permeable composite capstone layer), such surface water will eventually cause some or all of the liquid to pass through the permeable composite capstone layer. Once the liquid passes through the permeable composite capstone layer, the liquid contacts and is temporarily retained and/or absorbed in the one or more materials and/or voids in the porous storage medium layer. One or more contaminants in the liquid can be partially or fully broken down or eliminated by one or more remediating agents that are located in the porous storage medium layer. As such, when water exits the porous storage medium layer and into ground G, the amount of contaminates in the water are typically reduced. As such, the surface water mitigation structure of the present invention is capable of removing contaminants and/or pollutants from water (e.g., storm water runoff, waste water runoff, etc.) by subjecting the water to a multi-layered filtration and treatment system. After the water has been treated by the surface water mitigation structure, the treated water can be discharged to the ground, the surface, and/or a drainage system.

Figure 5:
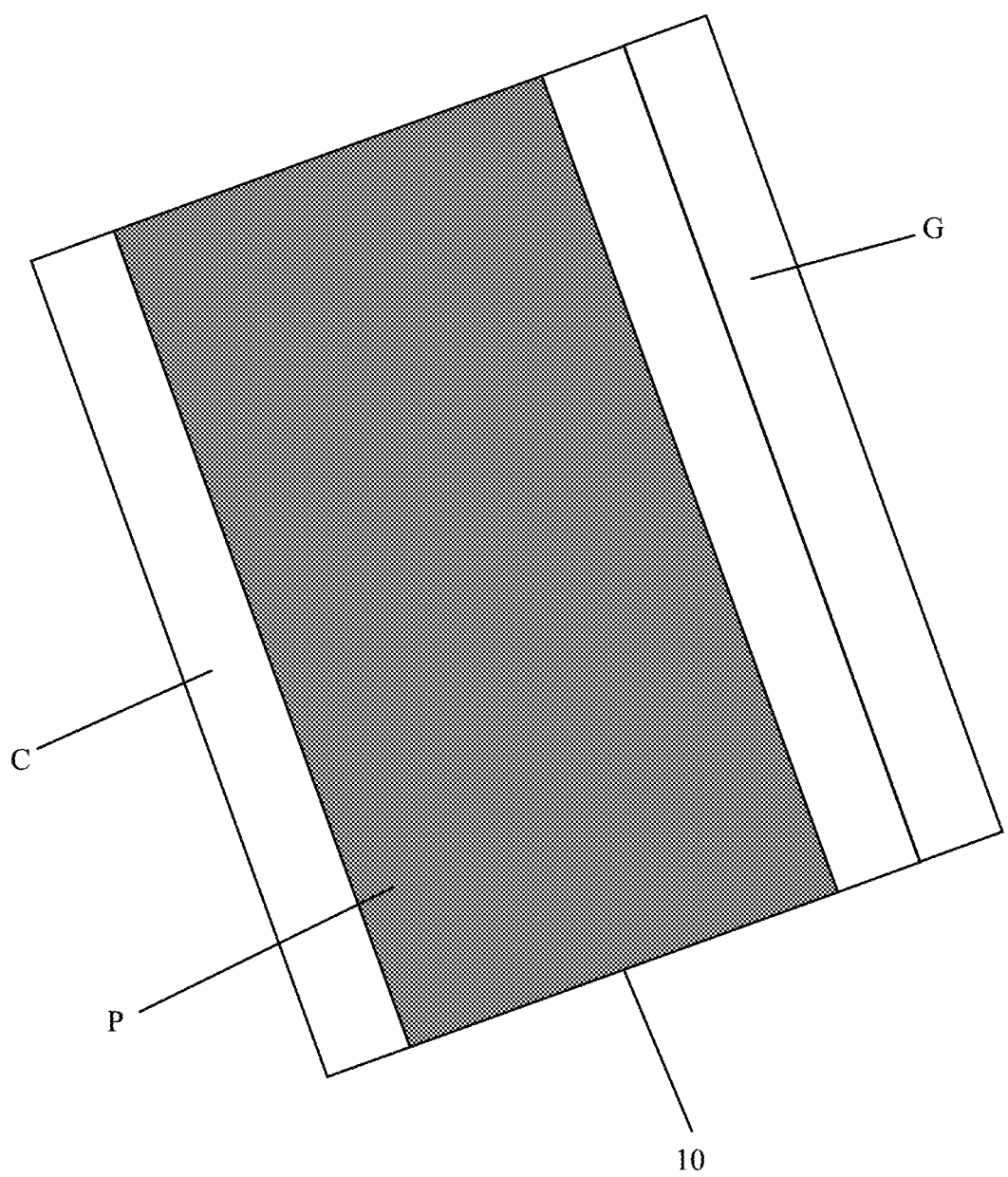
FIG. 5 is an illustration of a sidewalk or path formed by the surface water mitigation structure of the present invention and also illustrates an optional curb structure along the outer perimeter of the top surface of the surface water mitigation structure.

Referring now to FIG. 5, there is illustrated a path P that is formed of a surface water mitigation structure 10 in accordance with the present invention and an optional curb or border parameter C that is positioned between the top surface of the surface water mitigation structure 10 and the surface of ground G. The curb or border parameter can be used to partially or fully retain surface water on the top surface of the surface water mitigation structure until the surface water passes through permeable composite capstone layer 20 of the surface water mitigation structure 10.

During construction of the surface water mitigation structure, the porous storage medium layer is inserted onto the top of the ground surface. It is not uncommon that a portion of a ground surface is removed prior to the porous storage medium layer being inserted onto the top of the ground surface; however, this is not required. The one or more remediating agents in the porous storage medium layer can be included in the porous storage medium layer at the time that the porous storage medium layer is inserted on the ground surface and/or at some later time. After the porous storage medium layer has been applied to the ground surface, the permeable composite capstone layer is applied to the top of the porous storage medium layer. Generally, the permeable composite capstone layer is formed on the porous storage medium layer by applying a mixture of base material and uncured/unset or partially-cured/set binder to the top surface of the porous storage medium layer. After the binder in the permeable composite capstone layer has sufficiently cured and/or set, the surface water mitigation structure can be used. The one or more remediating agents for use in the porous storage medium layer can be initially inserted into the porous storage medium layer and/or the porous storage medium layer can be recharged with one or more remediating agents by pouring a solution of the one or more remediating agents onto the top surface of the permeable composite capstone layer; however, this is not required.

Figure 6:
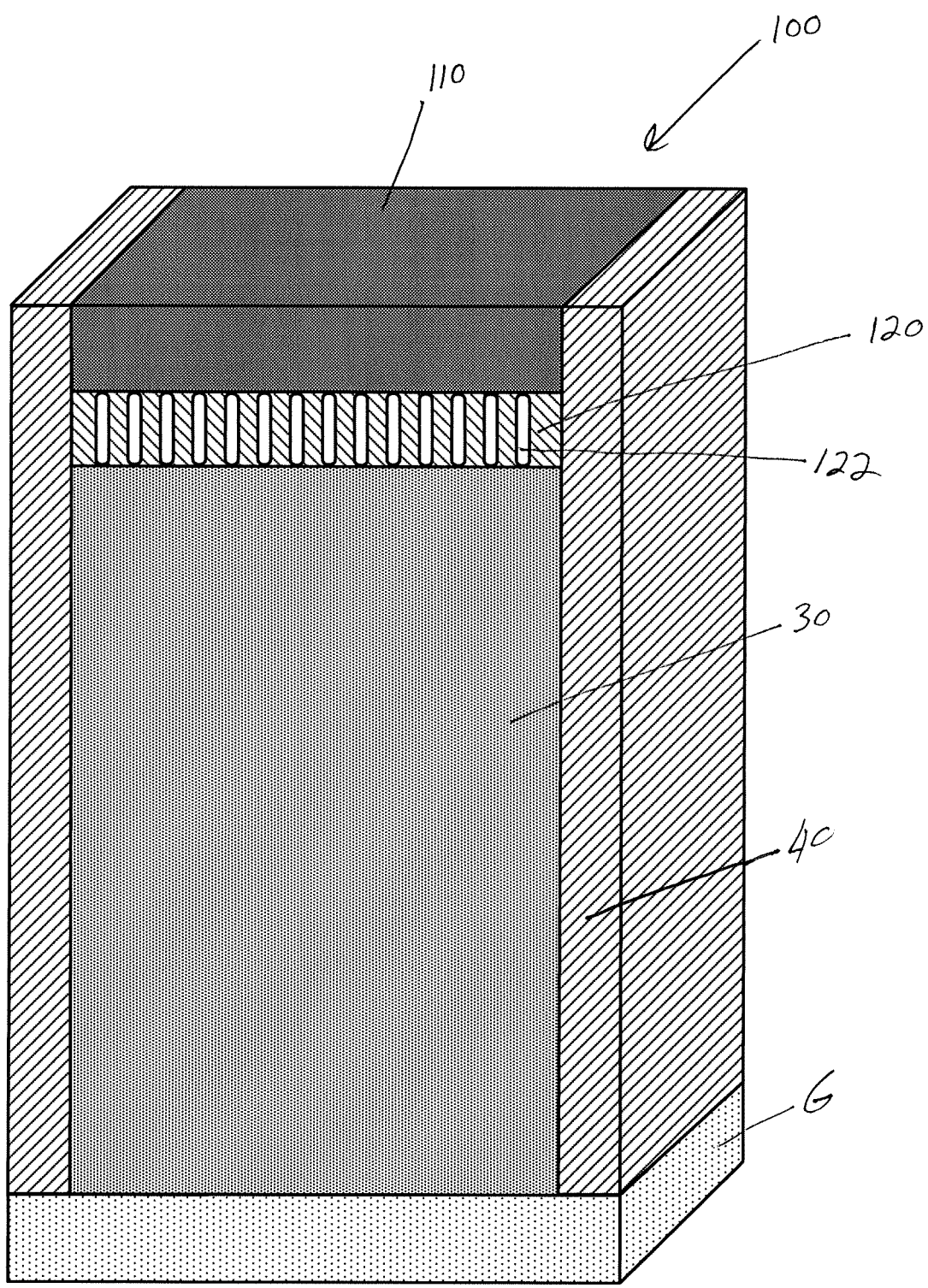
FIG. 6 is a cross-sectional perspective illustration of another surface water mitigation structure according to one non-limiting aspect of the present invention.

FIGS. 6-8 and 10 illustrate another non-limiting embodiment of the surface water mitigation structure 100 of the present invention. The surface water mitigation structure 100 includes a flexible porous layer 110, a support layer 120, and a porous storage medium layer 30. The porous storage medium layer 30 can be the same as the porous storage medium layer described above with respect to FIGS. 1-4. As illustrated in FIG. 6, the porous storage medium layer 30 is positioned on top of undisturbed ground G. The surface water mitigation structure 100 can also optionally include a watertight and/or impermeable material 40 (e.g., plastic sheet or board, waterproof fabric, vinyl sheet, etc.) on one or more sides of the flexible porous layer 110, the support layer 120 and/or the porous storage medium layer 30. Hence, watertight and/or impermeable material 40 (when used) has the same or similar function as the watertight and/or impermeable material described above with respect to FIGS. 1-4. The surface water mitigation structure 100 can also optionally include an elevated watertight and/or impermeable material or barrier on the top edge regions of the flexible porous layer 110 and/or the support layer 120 to inhibit or prevent runoff of water from the top edges of the flexible porous layer 110 and/or the support layer 120.

The first or top layer of the surface water mitigation structure 100 is a flexible porous layer 110 that is positioned on top of the support layer 120, which support layer 120 is positioned between the top flexible porous layer 110 and the porous storage medium layer 30. Generally, the top flexible porous layer is a preformed layer that is available in pre-cut sheets of material, or is available in rolls of material that can be cut to length and/or width.

In one non-limiting embodiment, the top flexible layer is partially or fully formed of a fiber mesh 112 that can a woven or non-woven mesh. The fiber can be a natural or man-made fiber. The thickness of the fiber mesh is generally at least 0.1 inches and is typically 0.1-5 inches. One non-limiting type of top flexible layer is a non-woven polypropylene fiber sheet such as Geotex® 401 by Popex. Such top flexible layers are generally available in precut sheets or in rolls of 50 ft. or more and a width of 5-15 feet at a thickness of 0.1-2 inches; however, the material can be available in other dimensions. The top flexible layer 110 generally has a liquid permeability of at least 0.25 inch of water per square foot per hour.

Figure 7A:
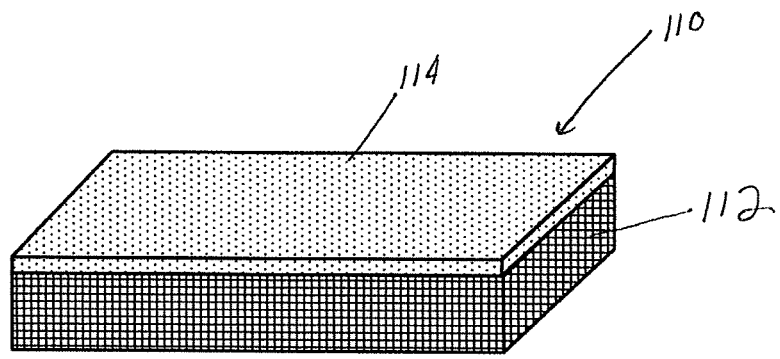
FIG. 7A is a cross-section view of a flexible layer that can be used in the surface water mitigation structure of FIG. 6.

As illustrated in FIG. 7A, the fibers in the top portion of the fiber mesh 112 or all of the fibers of the fiber mesh 112 can optionally include and/or be coated with a polymer coating 114. The thickness of the coating is non-limiting. If the polymer coating is applied such that a polymer layer is formed on the top surface of the fiber mesh as illustrated in FIG. 7A, then the polymer coating is formulated to be a porous coating. However, if the individual fibers of the fiber mesh are coated with the polymer, then the polymer may or may not be a porous polymer. Generally, the thickness of the polymer coating (when used) is at least 0.01 micron.

Figure 7B:
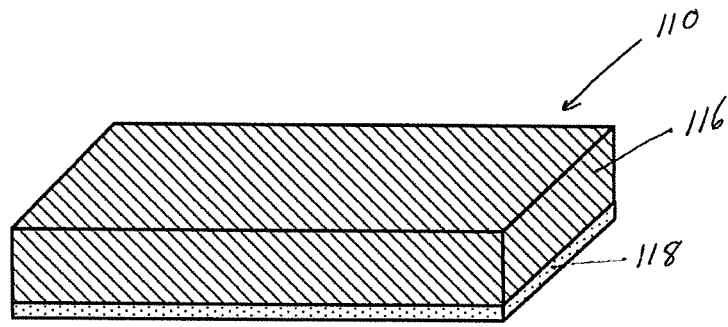
FIG. 7B is a cross-section view of another flexible layer that can be used in the surface water mitigation structure of FIG. 6.
Figure 7C:
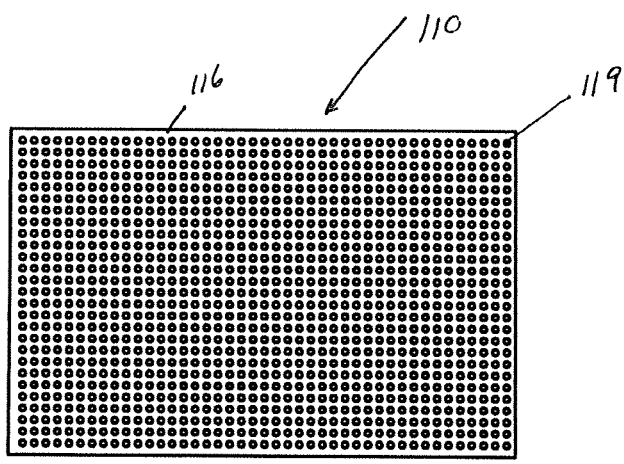
FIG. 7C is a top plan view of the flexible layer of FIG. 7B.
Figure 8:
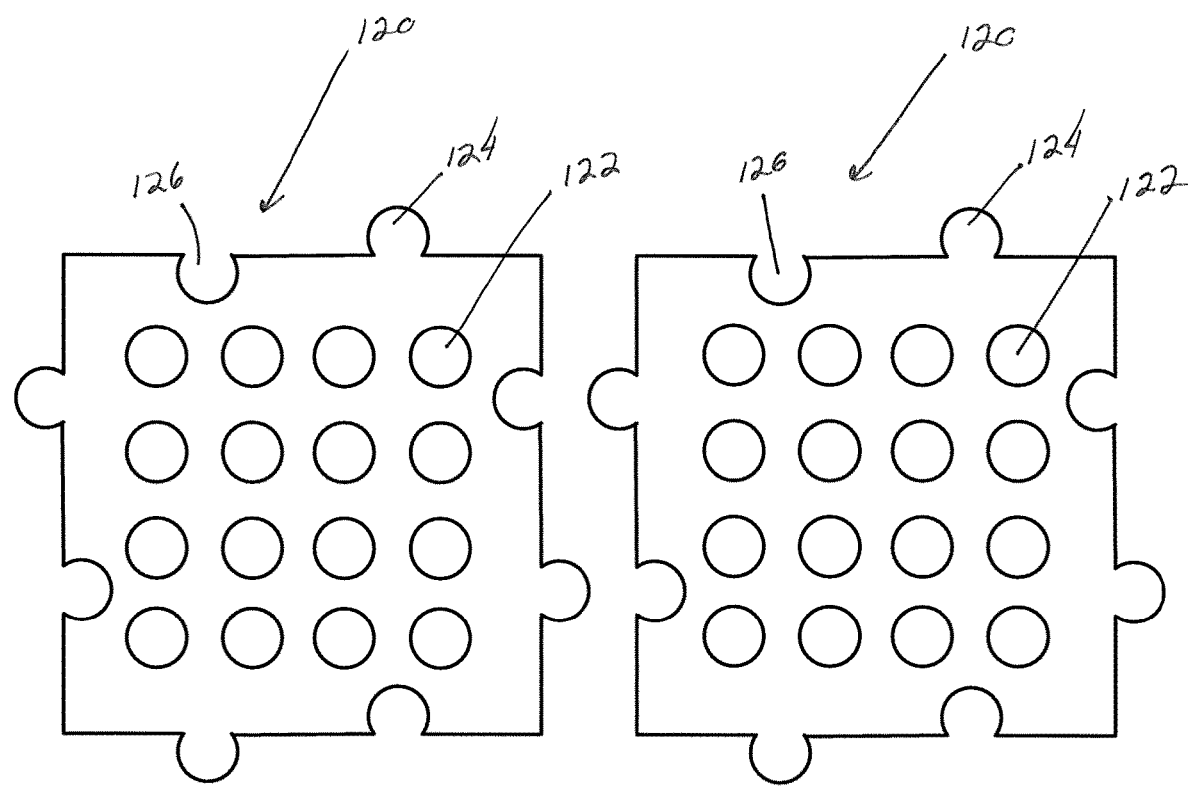
FIG. 8 is a top plan view of a non-limiting permeable support layer that can be used in the surface water mitigation structure of FIG. 6.

In another non-limiting embodiment, the top flexible porous layer 110 is a flexible polymer or rubber sheet 116 that may or may not have a reinforcement scrim or mat 118 as illustrated in FIG. 7B. One non-limiting type of polymer sheet is a vinyl polymer sheet. One non-limiting type of rubber sheet is a pervious rubber sheet that is formed of particles of rubber that are adhesively connected together (e.g., polyurethane binder, etc.). The thickness of the polymer or rubber sheet is generally at least 1 mm and typically 1 mm to 2 inch. If the polymer or rubber sheet is non-porous or has limited porosity, one or more openings 119 can be formed through the polymer or rubber sheet to obtain the desired amount of liquid flow through the sheet as illustrated in FIG. 7C. When one or more openings are included in the polymer or rubber sheet, the diameter of the one or more openings is generally less than 5 mm, and typically less than 3 mm. The polymer or rubber sheet is generally a preformed sheet. Such top flexible layers are generally available in precut sheets or in rolls of 50 ft. or more and a width of 5-15 feet at a thickness of 0.1-2 inches; however, the material can be available in other dimensions. The top flexible layer generally has a liquid permeability of at least 0.25 inch of water per square foot per hour.

The support layer 120 is configured to provide support to the top flexible porous layer 110. The support layer is generally formed of a different material from the top flexible support layer. The support layer generally is less flexible than the top flexible layer. Generally, the support layer is at least 30% less flexible than the top flexible layer. Generally, the thickness of the support layer is greater than the thickness of the top flexible layer; however, this is not required. The support layer can be formed of a variety of materials such as plastic or rubber material. In one non-limiting embodiment, the support layer is formed of a non-porous material (e.g., plastic material, some other polymer material or rubber material) and includes a plurality of openings or holes 122 that are formed fully through the non-porous material to enable liquid to flow through the support layer. When one or more openings are included in the support layer, the diameter of the one or more opening is generally at least 0.1 mm. The number and size of the openings in the support layer are selected that the flowrate of water through 1 ft.$^2$ of the support layer is at least 0.1 inch of water per square foot per hour. The support layer is generally a preformed layer. The thickness of the support layer is generally at least 0.25 inches.

The pieces of support layer can optionally be configured to be interlocking as illustrated in FIG. 9 so that a plurality of pieces of support layer can be connected together. In such a configuration, the pieces of support layer can includes structures such as a tongue or connection leg 124 and groove or connection cavity 126 that enable the pieces of support layer to be connected together. As can be appreciated, other means can be used to connect together the pieces of the support layer (e.g., hook and loop fastener, tape, adhesive, staples, melted seam connection, etc.).

Example 1

A walking or bike path is formed of the surface water mitigation structure of the present invention that includes a porous storage medium layer and a capstone layer. The ground surface is prepared by digging the ground surface to form a trench or cavity in the ground surface that is about 3-24 inches deep, and typically about 4-12 inches deep. Thereafter, a porous storage medium layer that includes limestone, expanded shale and/or expanded slate is inserted into the trench or cavity in the ground surface. Typically, the porous storage medium layer is inserted into the trench or cavity in the ground surface by pouring the particles of the porous storage medium layer into the trench or cavity in the ground surface. The average size of the particles of the storage medium components is about 0.2 mm to about 500 mm, and typically about 5-150 mm, and more typically about 10-80 mm. Generally, the average thickness of the porous storage medium layer is 3-24 inches, and typically 4-12 inches. The limestone, expanded shale and/or expanded slate constitutes about 50-100 wt. % of the porous storage medium layer, and typically about 80-100% of the porous storage medium layer. After the porous storage medium layer is inserted into the trench or cavity in the ground surface, a pre-set or pre-cured mixture of urethane resin and/or polyurethane resin and a base material (e.g., rubber, granite, concrete, stone, quartz, etc.) is added to the top surface of the porous storage medium layer. The urethane or polyurethane resin constitutes about 12-25 wt. % of the mixture and the base material constitutes about 75-88 wt. % of the mixture. One specific, non-limiting example, the permeable composite capstone layer includes a base material having an average particle size of 3-18 mm that is formed of first and second types of particles, wherein the first type of particle includes one or more of limestone, shale, slate, sandstone, quartz, feldspar, dolomite, obsidian, mica, diorite, flint, granite, stone, metal, glass, ceramic, recycled concrete, expanded shale, expanded slate, recycled metal, and/or recycled glass (e.g., granite, stone, quartz, concrete, etc.), and the second type of particle includes one or more of rubber, plastic, recycled asphalt, recycled plastic, and/or recycled rubber (e.g., recycled rubber, etc.), and wherein weight ratio of the first type of particle to the second type of particle is 1:10 to 0.1:1 (and all values and ranges therebetween), and wherein the first and second types of particles constitute 85-100 wt. % of the base material, and wherein the base material is bonded together with a binder that is formed of 80-100% one or more of epoxy resin, urethane and/or polyurethane resin, acrylic resin, styrene butadiene resin, silicone resin, vinylester resin, phenolic resin, polyester resin and/or fiberglass resin (e.g., polyurethane resin, etc.), and wherein the total weight of the base material and the binder constitutes about 90-100 wt. % of the permeable composite capstone layer. The pre-set or pre-cured mixture of urethane or polyurethane resin and base material is spread over the top surface of the porous storage medium layer such that the pre-set or pre-cured mixture of urethane or polyurethane resin and base material has a generally flat top surface and an average thickness of about 0.5-8 inches, and typically about 1-4 inches. The pre-set or pre-cured mixture of urethane or polyurethane resin and base material is then allowed to substantially or fully set or cure to form the rigid, permeable capstone layer. The bottom surface of the capstone layer bonds to a portion of the top surface of the porous storage medium layer during the setting or curing of the binder. The capstone layer is able to support a load on a top surface of the permeable composite capstone layer of at least 300 lbs./ft.$^2$ without breaking under such load, and has a deflection under such loads of less than 5%. After the mixture of urethane or polyurethane resin and base material is substantially or fully set or cured, a solution of microbes can be optionally poured onto the top surface of the capstone layer to charge the porous storage medium layer with the microbes. As can be appreciated, a solution of microbes can be optionally poured onto the top surface of the porous storage medium layer prior to forming the capstone layer on the porous storage medium layer to charge the porous storage medium layer with the microbes. The porous storage medium layer can optionally be periodically recharged with microbes as required by pouring a solution of microbes onto the top surface of the capstone layer. The capstone layer is formulated and configured to enable surface water on the top surface of the capstone layer to pass through the capstone layer at a rate of at least 5 inches of water per square foot per hour. The capstone layer forms a rigid top surface for the surface water mitigation structure to enable humans, pets and animals to safely walk on the top surface of the capstone layer, and to also allow bikes, children's wagons, and strollers to safely move on the top surface of the capstone layer without the cracking and breaking of the capstone layer.

Example 2

A vehicle road or vehicle parking lot is formed of the surface water mitigation structure of the present invention that includes a porous storage medium layer and a capstone layer. The ground surface is prepared by digging the ground surface to form a trench or cavity in the ground surface that is about 12-48 inches deep. Thereafter, a porous storage medium layer that includes limestone, expanded shale and/or expanded slate is inserted into the trench or cavity in the ground surface. Typically, the porous storage medium layer is inserted into the trench or cavity in the ground surface by pouring the particles of the porous storage medium layer into the trench or cavity in the ground surface. The average size of the particles of the storage medium components is about 0.2 mm to about 500 mm, and typically about 5 mm to 150 mm, and more typically about 10 mm to 80 mm. Generally, the average thickness of the porous storage medium layer is 12-48 inches, and typically 12-36 inches. The limestone, expanded shale and/or expanded slate constitutes about 50-100 wt. % of the porous storage medium layer, and typically about 80-100% of the porous storage medium layer. After the porous storage medium layer is inserted into the trench or cavity in the ground surface, a pre-set or pre-cured mixture of urethane or polyurethane resin and base material (e.g., rubber, granite, concrete, quartz, etc.) is added to the top surface of the porous storage medium layer. The urethane resin and/or polyurethane resin constitutes about 12-25 wt. % of the mixture and the base material constitutes about 75-88 wt. % of the mixture. One specific, non-limiting example, the permeable composite capstone layer includes a base material having an average particle size of 3-18 mm that is formed of first and second types of particles, wherein the first type of particle includes one or more of limestone, shale, slate, sandstone, quartz, feldspar, dolomite, obsidian, mica, diorite, flint, granite, stone, metal, glass, ceramic, recycled concrete, expanded shale, expanded slate, recycled metal, and/or recycled glass (e.g., granite, stone, quartz, concrete, etc.), and the second type of particle includes one or more of rubber, plastic, recycled asphalt, recycled plastic, and/or recycled rubber (e.g., recycled rubber, etc.), and wherein weight ratio of the first type of particle to the second type of particle is 1:10 to 0.1:1 (and all values and ranges therebetween), and wherein the first and second types of particles constitute 85-100 wt. % of the base material, and wherein the base material is bonded together with a binder that is formed of 80-100% one or more of epoxy resin, urethane resin and/or polyurethane resin, acrylic resin, styrene butadiene resin, silicone resin, vinylester resin, phenolic resin, polyester resin and/or fiberglass resin (e.g., polyurethane resin, etc.), and wherein the total weight of the base material and the binder constitutes about 90-100 wt. % of the permeable composite capstone layer. The pre-set or pre-cured mixture of urethane or polyurethane resin and base material is spread over the top surface of the porous storage medium layer such that the pre-set or pre-cured mixture of urethane or polyurethane resin and base material has a generally flat top surface and an average thickness of about 1-12 inches, and typically about 2-6 inches. The pre-set or pre-cured mixture of urethane or polyurethane resin and base material is then allowed to substantially or fully set or cure to form the rigid, permeable capstone layer. The bottom surface of the capstone layer bonds to a portion of the top surface of the porous storage medium layer during the setting or curing of the binder. The capstone layer is able to support a load on a top surface of the permeable composite capstone layer of at least 1000 lbs./ft.$^2$ without breaking under such load, and has a deflection under such loads of less than 5%. After the mixture of urethane or polyurethane resin and base material is substantially or fully set or cured, a solution of microbes can be optionally poured onto the top surface of the capstone layer to charge the porous storage medium layer with the microbes. As can be appreciated, a solution of microbes can be optionally poured onto the top surface of the porous storage medium layer prior to forming the capstone layer on the porous storage medium layer to charge the porous storage medium layer with the microbes. The porous storage medium layer can optionally be periodically recharged with microbes as required by pouring a solution of microbes onto the top surface of the capstone layer. The capstone layer is formulated and configured to enable surface water on the top surface of the capstone layer to pass through the capstone layer at a rate of at least 5 inches of water per square foot per hour. The capstone layer forms a rigid top surface for the surface water mitigation structure to enable humans, pets and animals to safely walk on the top surface of the capstone layer, also allow bikes, children's wagons, and strollers to safely move on the top surface of the capstone layer, and also allow cars, trucks and other vehicles to safely move on the top surface of the capstone layer without the cracking and breaking of the capstone layer.

Example 3

A horse stall or animal shelter with flexible layer is formed of the surface water mitigation structure of the present invention that includes a porous storage medium layer, a support layer and a flexible porous layer. The ground surface is prepared by digging the ground surface to form a trench or cavity in the ground surface that is about 3-24 inches deep, and typically about 4-10 inches. Thereafter, a porous storage medium layer that includes limestone, expanded shale and/or expanded slate is inserted into the trench or cavity in the ground surface. Typically, the porous storage medium layer is inserted into the trench or cavity in the ground surface by pouring the particles of the porous storage medium layer into the trench or cavity in the ground surface. The average size of the particles of the storage medium components is about 0.2 mm to about 500 mm, and typically about 5-150 mm, and more typically about 10-80 mm. Generally, the average thickness of the porous storage medium layer is 3-24 inches, and typically 4-10 inches. The limestone, expanded shale and/or expanded slate constitutes about 50-100 wt. % of the porous storage medium layer, and typically about 80-100% of the porous storage medium layer. After the porous storage medium layer is inserted into the trench or cavity in the ground surface, a support layer is place over the top surface of the porous storage medium layer. The support layer is formed of a rubber material having an average thickness of about 0.3-2 inches, and typically about 0.5-1.5 inches. The rubber support layer generally has a durometer hardness of 40-80 Shore A, and typically about 55-65 Shore A. A plurality of perforations or holes are formed in the rubber material of the support layer so that liquid can pass through the support layer. The average size of the openings is generally 0.05-4 inches in diameter, and typically 0.1-3 inches in diameter, and more typically about 0.5-2.5 inches in diameter. The support layer is generally applied as pieces of material on the top surface of the porous storage medium layer. The pieces of support layer can optionally be connected together; however, this is not required. Generally, the support layer is formed of pre-formed pieces of material. After the support layer has been inserted over the porous storage medium layer, a flexible porous layer is inserted over the top surface of the support layer. The flexible porous layer is formed of a non-woven polymer material (e.g., polypropylene, etc.) having an average thickness of 0.2-1.5 inches, and typically 0.3-0.5 inches. Generally, the flexible porous layer is provided in a roll of material that is cut to length. If the width of the roll of material of flexible porous layer is too small, sheets of flexible porous layer can be placed side by side. The side-by-side sheets of flexible porous layer can optionally be connected together by various means (e.g., hook and loop fastener, tape, adhesive, staples, sewn connection, melted seam connection, etc.). Prior to and/or after the flexible porous layer is applied over the top surface of the support layer, a solution of microbes can be optionally poured onto the top surface of the flexible porous layer or top surface of the support layer to charge the porous storage medium layer with the microbes. As can be appreciated, a solution of microbes can be optionally poured onto the top surface of the porous storage medium layer to charge the porous storage medium layer with the microbes prior to placing the support later on top of the porous storage medium layer. As can be appreciated, the porous storage medium layer can optionally be periodically recharged with microbes as required by pouring a solution of microbes on the flexible porous layer, support layer and/or the porous storage medium layer. The flexible porous layer and support layer form a top surface for the surface water mitigation structure to enable humans, pets and animals to safely walk on the top surface of the flexible porous layer. The top surface provides a strong, yet soft, surface for animals to walk on can be easily cleaned by simply spraying water on the top surface of the flexible porous layer. The flexible porous layer can be easily replaced when worn after excessive use. In some non-limiting applications, a drain system can be placed under the surface water mitigation structure to remove water after it has passed through the surface water mitigation structure.

To aid the USPTO and any readers of this application and any resulting patent in interpreting the claims appended hereto, Applicant does not intend any of the appended claims or claim elements to invoke 35 U.S.C. 112(f) unless the words "means for" or "step for" are explicitly used in the particular claim.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

What is claimed:

1. A method for forming a surface mitigation structure that can be use in an animal stable floor, animal stall floor, or animal shelter floor; said method comprises:
   a) digging up a ground surface in said animal stable floor, said animal stall floor, or said animal shelter floor to create a ground cavity at least 3 inches deep;
   b) depositing particles of a porous storage medium in said cavity to form a porous storage medium layer; said porous storage medium comprising a water-absorbent material;
   c) inserting a support layer on or above a top surface of said porous storage medium layer; said support layer formed of I) a permeable rigid composite; said permeable rigid composite includes a mixture of base material and binder; said base material including first particles and second particles; said first particles and said second particles formed of different materials; said permeable rigid composite having a composition and thickness to support a load on a top surface of said permeable rigid composite of at least 50 lbs/ft.$^2$ without breaking or cracking under such load; said base material constituting at least 55 wt. % of said permeable rigid composite; said binder constituting at least 5 wt. % of said permeable rigid composite; a total weight percent of said base material and said binder constitutes 90-100 wt. % of said permeable rigid composite; or II) a support material including a plurality of openings there through; an average size of said plurality of openings is less than said average particle size of said porous storage medium layer; and,
   d) inserting a porous flexible layer on or above a top surface of said support layer; said porous flexible layer configured to allow water to pass through said porous flexible layer at a rate of at least 0.25 inches of water per square foot per hour; said porous flexible layer having a thickness of at least 0.1 inches; said porous flexible layer formed of a different material than said support layer; said porous flexible layer having a flexibility that is at least 30% greater than a flexibility of said support layer.

2. The method as defined in claim 1, further including the step of impregnating said porous storage medium with remediating agent.

3. The method as defined in claim 1, wherein said step of inserting said support layer on or above said top surface of said layer of said porous storage medium further includes:
   a) preparing a mixture of materials for use in forming said permeable rigid composite; said mixture of materials including said base material and said binder; said base material in said mixture is at least partially wetted by said binder by mixing said binder when not fully cured with said base material;
b) pouring said mixture of materials over said top surface of said porous storage medium; said binder not fully cured when said mixture of materials is poured on said top surface of said porous storage medium;
c) spreading said mixture of materials over said top surface of said porous storage medium prior to said binder being fully cured to form a flat top surface of said mixture of materials; and,
d) allowing said binder in said mixture of materials to fully cure to form said permeable rigid composite.

4. The method as defined in claim 1, wherein said step of inserting said support layer on or above said top surface of said layer of said porous storage medium further includes:
a) providing a plurality of pieces of said support material; applying said plurality of pieces of said support material on said top surface of said porous storage medium; and,
b) connecting together said plurality of pieces of said support material by use of a connection arrangement.

5. The method as defined in claim 1, further includes the step of inserting a watertight barrier at least partially about sides of said porous storage medium; said watertight barrier configured to prevent fluid flow into an exterior environment due to flow flowing through a side of said porous storage medium including said watertight barrier.

6. A method for forming a surface water mitigation structure on a ground surface, said method comprises:
a) forming a cavity, said cavity is at least about 3 inches deep;
b) depositing particles of a porous storage medium in said cavity;
c) preparing a mixture of materials for use in forming a permeable rigid composite; said mixture of materials including a base material and a binder; said base material in said mixture is at least partially wetted by said binder by mixing said binder when not fully cured with said base material; said base material includes first particles and second particles; said first particles selected from the group consisting of limestone, shale, slate, sandstone, quartz, feldspar, dolomite, obsidian, mica, diorite, flint, granite, glass, concrete, expanded shale, and expanded slate; said second particles selected from the group consisting of rubber, recycled asphalt and recycled plastic; an average particle size of said first particles and said second particles is 3-30 mm; said base material constitutes 55-99.5 wt. % of said permeable rigid composite; said binder constitutes 0.5-45 wt. % of said permeable rigid composite; said first particles and said second particles are formed of different materials; said binder includes 80-100 wt. % of one or more materials selected from the group consisting of epoxy, urethane, styrene, butadiene, and silicone; said first particles constitute 20-80 wt. % of said permeable rigid composite; said second particles constitute 20-80 wt. % of said permeable rigid composite; said binder at least partially binding together said base material once said binder is fully cured; a total weight of said base material and said binder constitutes about 90-100 wt. % of said permeable rigid composite;
d) pouring said mixture of materials over a top surface of said porous storage medium; said binder not fully cured when said mixture of materials is poured on said top surface of said porous storage medium;
e) spreading said mixture of materials over said top surface of said porous storage medium prior to said binder being fully cured to form a flat a top surface of said mixture of materials;
f) allowing said binder in said mixture of materials to fully cure to form said permeable rigid composite; said binder at least partially binding together said base material once said resin is fully cured; said permeable rigid composite has a composition and thickness to support a load on a top surface of said rigid and permeable composite capstone layer of least 300 lbs/ft.$^2$ without breaking under such load and has a deflection under such load of less than 5%; said permeable rigid composite porous to water to enable surface water on a top surface of said permeable rigid composite to flow through said permeable composite rigid capstone layer and into said porous storage medium; said permeable rigid composite configured to allow water to pass through said permeable rigid composite at a rate of at least 0.25 inches of water per square foot per hour; a thickness ratio of said permeable rigid composite to said porous storage medium is at least 1:1.2; said permeable rigid composite having a thickness of 0.1-5 inches; and
g) impregnating said porous storage medium with remediating agent by pouring a solution of said remediating agent onto a top surface of said permeable rigid composite and allowing said solution to penetrate through said permeable rigid composite and into said porous storage medium; said solution of said remediating agent poured into said top surface of said permeable rigid composite after said binder has fully cured; said remediating agent constituting 0.1 vol. % to 40 vol. % of said porous storage medium after said porous storage medium has been impregnated with said remediating agent.

7. The method as defined in claim 6, wherein said permeable rigid composite includes 10-20 wt. % of a binder, and less than about 2 wt. % of an additive; said first particles include concrete and said second particle includes rubber; said water-absorbent material includes one or more materials selected from the group consisting of expanded shale and expanded slate.

8. The method as defined in claim 7, wherein said additive includes silane.

9. The method as defined in claim 6, further including the step of forming a watertight barrier at least partially about sides of said porous storage medium; said watertight barrier configured to prevent fluid flow into an exterior environment due to flow flowing through a side of said porous storage medium that includes said watertight barrier.

10. The method as defined in claim 6, wherein said water-absorbent material includes 5-95 wt. % of a first storage medium layer component, and 0-85 wt. % of a second storage medium layer component; said porous storage medium includes 0.1-30 wt. % of a first remediating agent, and 0-30 wt. % of a second remediating agent; said first remediating agent includes one or more microbes selected from the group consisting of *Micrococcus, Arthrobacter, Rhodococcus, Pantoea* aggiomerans, *Microbacterium laevaniformans, Pseudomonas putida, Achromobacter, Aspergillys, Bacillus, Candida, Cladosporium, Corynebacterium, Myrothecium, Punicillium, Phialophora, Phodotho-rula, Streptomyces,* and *Trichoderma*.

* * * * *